United States Patent
Suzuki et al.

(10) Patent No.: US 9,125,208 B2
(45) Date of Patent: Sep. 1, 2015

(54) METHOD AND APPARATUS OF TRANSITION TO A BATTERY EFFICIENT STATE OR CONFIGURATION BY INDICATING END OF DATA TRANSMISSION IN LONG TERM EVOLUTION

(75) Inventors: Takashi Suzuki, Tokyo (JP); Richard Charles Burbidge, Slough (GB); Zhijun Cai, Irving, TX (US); Gordon Peter Young, Slough (GB); Claude Jean-Frederic Arzelier, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 375 days.

(21) Appl. No.: 12/616,024

(22) Filed: Nov. 10, 2009

(65) Prior Publication Data

US 2010/0118752 A1    May 13, 2010

Related U.S. Application Data

(60) Provisional application No. 61/113,094, filed on Nov. 10, 2008.

(51) Int. Cl.
```
H04W 76/04    (2009.01)
H04W 52/02    (2009.01)
H04W 36/14    (2009.01)
H04W 76/06    (2009.01)
H04W 88/06    (2009.01)
```

(52) U.S. Cl.
CPC ........ *H04W 76/048* (2013.01); *H04W 52/0258* (2013.01); *H04W 76/046* (2013.01); *H04W 36/14* (2013.01); *H04W 76/06* (2013.01); *H04W 88/06* (2013.01); *Y02B 60/50* (2013.01)

(58) Field of Classification Search
USPC .......... 370/311; 455/574, 154.1, 127.5, 343.5
See application file for complete search history.

(56) References Cited

U.S. PATENT DOCUMENTS

| | | | |
|---|---|---|---|
| 5,812,636 | A | 9/1998 | Tseng et al. |
| 6,064,340 | A | 5/2000 | Croft et al. |
| 6,181,683 | B1 | 1/2001 | Chevillat et al. |
| 6,223,044 | B1 | 4/2001 | Schultz |
| 6,229,989 | B1 | 5/2001 | Kwon |
| 6,243,579 | B1 | 6/2001 | Kari |
| 6,275,712 | B1 | 8/2001 | Gray et al. |
| 6,345,185 | B1 | 2/2002 | Yoon et al. |

(Continued)

FOREIGN PATENT DOCUMENTS

| | | |
|---|---|---|
| AU | 2007202206 | 12/2007 |
| CA | 2781497 | 5/2011 |

(Continued)

OTHER PUBLICATIONS

"Fast Dormancy: A Way Forward", 3GPP R2-085134, pp. 1-14, Aug. 22, 2008.*

(Continued)

*Primary Examiner* — Habte Mered
(74) *Attorney, Agent, or Firm* — Fish & Richardson P.C.

(57) ABSTRACT

A method is provided for sending a Fast Dormancy (FD) indication from a User Equipment (UE) to an access device through a Media Access Control (MAC) layer. The method includes receiving an indication from an upper layer that there is no more data for a prolonged period of time and generating and sending a MAC control element to the access device.

8 Claims, 9 Drawing Sheets

(56) References Cited

U.S. PATENT DOCUMENTS

| | | | |
|---|---|---|---|
| 6,377,790 B1 | 4/2002 | Ishii | |
| 6,593,850 B1 | 7/2003 | Addy | |
| 6,654,360 B1 | 11/2003 | Abrol | |
| 6,657,984 B1 | 12/2003 | Semper | |
| 6,661,777 B1 | 12/2003 | Blanc et al. | |
| 6,668,175 B1 | 12/2003 | Almgren | |
| 6,748,246 B1 | 6/2004 | Khullar | |
| 6,845,236 B2 | 1/2005 | Chang | |
| 6,847,610 B1 | 1/2005 | Suumaki | |
| 6,961,570 B2 | 11/2005 | Kuo et al. | |
| 7,130,668 B2 | 10/2006 | Chang et al. | |
| 7,155,261 B2 | 12/2006 | Chen | |
| 7,164,673 B2 | 1/2007 | Jang | |
| 7,280,506 B2 | 10/2007 | Lin et al. | |
| 7,313,408 B2 | 12/2007 | Choi | |
| 7,353,120 B2 | 4/2008 | Enta | |
| 7,437,172 B2 | 10/2008 | Chen et al. | |
| 7,480,267 B2 | 1/2009 | Funnell et al. | |
| 7,539,160 B2 | 5/2009 | Virtanen et al. | |
| 7,609,673 B2 | 10/2009 | Bergenlid et al. | |
| 7,623,869 B2 | 11/2009 | Lee et al. | |
| 7,720,482 B2 | 5/2010 | Chaudry et al. | |
| 7,761,097 B2 | 7/2010 | Chaudry et al. | |
| 7,894,375 B2 | 2/2011 | Chaudry et al. | |
| 7,949,377 B2 * | 5/2011 | Islam et al. | 455/574 |
| 7,969,924 B2 | 6/2011 | Young et al. | |
| 8,014,772 B2 | 9/2011 | Beming et al. | |
| 8,208,950 B2 | 6/2012 | Islam et al. | |
| 8,223,697 B2 | 7/2012 | Dwyer et al. | |
| 8,243,683 B2 | 8/2012 | Young et al. | |
| 8,265,034 B2 | 9/2012 | Islam et al. | |
| 8,270,932 B2 | 9/2012 | Kim et al. | |
| 8,305,924 B2 | 11/2012 | Dwyer et al. | |
| 8,310,970 B2 | 11/2012 | Dwyer et al. | |
| 8,644,829 B2 | 2/2014 | Islam et al. | |
| 8,682,372 B2 | 3/2014 | Islam et al. | |
| 2001/0018342 A1 | 8/2001 | Vialen et al. | |
| 2001/0034254 A1 | 10/2001 | Ranta | |
| 2002/0022455 A1 | 2/2002 | Salokannel et al. | |
| 2002/0077105 A1 * | 6/2002 | Chang | 455/436 |
| 2002/0082020 A1 | 6/2002 | Lee et al. | |
| 2002/0141331 A1 | 10/2002 | Mate et al. | |
| 2002/0159444 A1 | 10/2002 | Vialen et al. | |
| 2003/0003895 A1 | 1/2003 | Wallentin et al. | |
| 2003/0014145 A1 | 1/2003 | Reiss et al. | |
| 2003/0031159 A1 | 2/2003 | Sayeedi et al. | |
| 2003/0156578 A1 | 8/2003 | Bergenlid et al. | |
| 2003/0157927 A1 | 8/2003 | Yi et al. | |
| 2003/0211846 A1 | 11/2003 | Nagpal et al. | |
| 2004/0044771 A1 | 3/2004 | Allred et al. | |
| 2004/0062262 A1 | 4/2004 | Venteicher et al. | |
| 2004/0120253 A1 | 6/2004 | Forssell et al. | |
| 2004/0156338 A1 | 8/2004 | Pasanen et al. | |
| 2004/0179490 A1 | 9/2004 | Jang | |
| 2004/0192312 A1 | 9/2004 | Li et al. | |
| 2004/0203778 A1 | 10/2004 | Kuo et al. | |
| 2004/0203971 A1 | 10/2004 | Kuo | |
| 2004/0216144 A1 | 10/2004 | Mitsui | |
| 2004/0224688 A1 | 11/2004 | Fischer | |
| 2005/0009527 A1 | 1/2005 | Sharma | |
| 2005/0026597 A1 | 2/2005 | Kim et al. | |
| 2005/0032555 A1 | 2/2005 | Jami et al. | |
| 2005/0141471 A1 | 6/2005 | Virtanen et al. | |
| 2005/0143056 A1 | 6/2005 | Iyer et al. | |
| 2005/0153700 A1 | 7/2005 | Farnsworth et al. | |
| 2005/0185613 A1 | 8/2005 | Kowalski et al. | |
| 2005/0192021 A1 | 9/2005 | Lee et al. | |
| 2005/0232176 A1 | 10/2005 | Van Lieshout et al. | |
| 2005/0237935 A1 | 10/2005 | Chae et al. | |
| 2005/0245267 A1 | 11/2005 | Guethaus | |
| 2005/0266846 A1 | 12/2005 | Kim | |
| 2005/0272422 A1 | 12/2005 | Asadi | |
| 2005/0281269 A1 | 12/2005 | Choi | |
| 2005/0286461 A1 | 12/2005 | Zhang et al. | |
| 2006/0025122 A1 | 2/2006 | Harris et al. | |
| 2006/0036741 A1 | 2/2006 | Kiss et al. | |
| 2006/0040645 A1 * | 2/2006 | Grilli et al. | 455/412.1 |
| 2006/0089137 A1 | 4/2006 | Howell | |
| 2006/0094478 A1 | 5/2006 | Kim et al. | |
| 2006/0109846 A1 | 5/2006 | Lioy et al. | |
| 2006/0111110 A1 | 5/2006 | Schwarz et al. | |
| 2006/0176167 A1 | 8/2006 | Dohrmann | |
| 2006/0182022 A1 | 8/2006 | Abedi | |
| 2006/0223537 A1 | 10/2006 | Kojima | |
| 2006/0223564 A1 | 10/2006 | Rosen et al. | |
| 2006/0240823 A1 | 10/2006 | Jiao et al. | |
| 2006/0293067 A1 | 12/2006 | Leung et al. | |
| 2007/0072635 A1 | 3/2007 | Zhao et al. | |
| 2007/0121540 A1 | 5/2007 | Sharp et al. | |
| 2007/0135080 A1 * | 6/2007 | Islam et al. | 455/343.1 |
| 2007/0270140 A1 | 11/2007 | Islam et al. | |
| 2008/0031273 A1 | 2/2008 | Wang | |
| 2008/0039087 A1 | 2/2008 | Gallagher et al. | |
| 2008/0049662 A1 | 2/2008 | Islam et al. | |
| 2008/0123658 A1 | 5/2008 | Hyytia et al. | |
| 2008/0126554 A1 | 5/2008 | Sakai et al. | |
| 2008/0212542 A1 | 9/2008 | Kung et al. | |
| 2008/0232310 A1 | 9/2008 | Xu | |
| 2008/0253312 A1 * | 10/2008 | Park | 370/311 |
| 2008/0304510 A1 | 12/2008 | Qlu | |
| 2008/0310313 A1 | 12/2008 | Maheshwari et al. | |
| 2009/0028084 A1 * | 1/2009 | Ping | 370/311 |
| 2009/0042560 A1 | 2/2009 | Islam et al. | |
| 2009/0088134 A1 | 4/2009 | Ishii et al. | |
| 2009/0093262 A1 | 4/2009 | Gao et al. | |
| 2009/0119564 A1 * | 5/2009 | Sagfors et al. | 714/748 |
| 2009/0124212 A1 | 5/2009 | Islam et al. | |
| 2009/0124249 A1 | 5/2009 | Young et al. | |
| 2009/0129339 A1 | 5/2009 | Young et al. | |
| 2009/0149189 A1 * | 6/2009 | Sammour et al. | 455/450 |
| 2009/0161571 A1 | 6/2009 | Terry et al. | |
| 2009/0176495 A1 | 7/2009 | Beming et al. | |
| 2009/0221277 A1 * | 9/2009 | Fomin et al. | 455/418 |
| 2009/0225709 A1 * | 9/2009 | Wager et al. | 370/329 |
| 2009/0245203 A1 * | 10/2009 | Pani et al. | 370/331 |
| 2009/0253422 A1 | 10/2009 | Fischer | |
| 2009/0318199 A1 * | 12/2009 | Barreto et al. | 455/574 |
| 2010/0046533 A1 | 2/2010 | Kuramoto et al. | |
| 2010/0061361 A1 * | 3/2010 | Wu | 370/350 |
| 2010/0075679 A1 * | 3/2010 | Tenny et al. | 455/436 |
| 2010/0118752 A1 | 5/2010 | Suzuki et al. | |
| 2010/0142457 A1 * | 6/2010 | Chun et al. | 370/329 |
| 2010/0208696 A1 * | 8/2010 | Lee et al. | 370/331 |
| 2010/0226325 A1 * | 9/2010 | Chun et al. | 370/329 |
| 2010/0265896 A1 * | 10/2010 | Park et al. | 370/329 |
| 2010/0323703 A1 | 12/2010 | Pirskanen | |
| 2011/0007682 A1 | 1/2011 | Islam et al. | |
| 2011/0038347 A1 | 2/2011 | Patil et al. | |
| 2011/0122818 A1 | 5/2011 | Dwyer et al. | |
| 2011/0124294 A1 | 5/2011 | Dwyer et al. | |
| 2011/0159895 A1 | 6/2011 | Arzelier et al. | |
| 2011/0182193 A1 | 7/2011 | Dwyer et al. | |
| 2011/0207465 A1 | 8/2011 | Dwyer et al. | |
| 2011/0249575 A1 | 10/2011 | Dwyer et al. | |
| 2011/0267959 A1 * | 11/2011 | Yi et al. | 370/241 |
| 2011/0306352 A1 | 12/2011 | Young et al. | |
| 2012/0008585 A1 | 1/2012 | Kwon et al. | |
| 2012/0014325 A1 | 1/2012 | Dwyer et al. | |
| 2012/0014326 A1 | 1/2012 | Dwyer et al. | |
| 2012/0033626 A1 | 2/2012 | Dwyer et al. | |
| 2012/0051288 A1 | 3/2012 | Dwyer et al. | |
| 2012/0051289 A1 | 3/2012 | Dwyer et al. | |
| 2012/0281561 A1 | 11/2012 | Shukla et al. | |
| 2012/0307703 A1 | 12/2012 | Young et al. | |
| 2012/0320811 A1 | 12/2012 | Islam et al. | |
| 2013/0021919 A1 | 1/2013 | Islam et al. | |
| 2013/0122918 A1 | 5/2013 | Boley et al. | |
| 2013/0188543 A1 | 7/2013 | Dwyer et al. | |
| 2013/0295905 A1 | 11/2013 | Islam et al. | |
| 2013/0308578 A1 | 11/2013 | Dwyer et al. | |
| 2013/0316720 A1 | 11/2013 | Dwyer et al. | |
| 2013/0336258 A1 | 12/2013 | Young et al. | |
| 2014/0194131 A1 | 7/2014 | Islam et al. | |
| 2014/0206369 A1 | 7/2014 | Islam et al. | |

(56) References Cited

U.S. PATENT DOCUMENTS

FOREIGN PATENT DOCUMENTS

| | | |
|---|---|---|
| CA | 2781630 | 5/2011 |
| CA | 2661592 C | 10/2013 |
| CN | 1328756 A | 12/2001 |
| CN | 1328756 A | 12/2001 |
| CN | 1363144 | 8/2002 |
| CN | 1934802 A | 3/2007 |
| CN | 101005659 A | 7/2007 |
| CN | 101005659 A | 7/2007 |
| CN | 101080102 A | 11/2007 |
| CN | 101114988 | 1/2008 |
| CN | 101409606 | 4/2009 |
| CN | 101426278 | 5/2009 |
| CN | 101453742 A | 6/2009 |
| CN | 103619071 | 3/2014 |
| EP | 0695069 | 1/1996 |
| EP | 1006695 A1 | 6/2000 |
| EP | 1453286 | 1/2004 |
| EP | 1511337 | 3/2005 |
| EP | 1560381 | 8/2005 |
| EP | 1596616 A1 | 11/2005 |
| EP | 1608113 | 12/2005 |
| EP | 1798998 | 6/2007 |
| EP | 1798998 A1 | 6/2007 |
| EP | 1858209 | 11/2007 |
| EP | 2019512 | 12/2007 |
| EP | 1892895 | 2/2008 |
| EP | 1981224 A1 | 10/2008 |
| EP | 2028909 | 2/2009 |
| EP | 2061192 | 5/2009 |
| EP | 2061192 A1 | 5/2009 |
| EP | 2244499 | 10/2010 |
| EP | 2247146 | 11/2010 |
| EP | 2271168 | 1/2011 |
| EP | 2061192 B1 | 4/2012 |
| EP | 2654369 A2 | 10/2013 |
| EP | 2667679 A2 | 11/2013 |
| EP | 2592895 B1 | 7/2014 |
| HK | 1105132 | 12/2011 |
| JP | 09-055764 | 2/1997 |
| JP | 11-313370 A | 11/1999 |
| JP | 11-331947 | 11/1999 |
| JP | 2000-174820 | 6/2000 |
| JP | 2000-261372 | 9/2000 |
| JP | 2001-275168 | 10/2001 |
| JP | 2003-037874 | 2/2003 |
| JP | 2004-032391 A | 1/2004 |
| JP | 2005-175831 A | 6/2005 |
| JP | 2005-525760 | 8/2005 |
| JP | 2006-510244 | 3/2006 |
| JP | 2006106409 | 4/2006 |
| JP | 2006-518125 A | 8/2006 |
| JP | 200760029 | 3/2007 |
| JP | 2007-166627 | 6/2007 |
| JP | 2008-509627 A | 3/2008 |
| JP | 2009-504047 A | 1/2009 |
| JP | 2009-508372 A | 2/2009 |
| JP | 2009514387 | 4/2009 |
| JP | 2009-534980 A | 9/2009 |
| JP | 2011-504020 A | 1/2011 |
| JP | 2012508533 | 4/2012 |
| JP | 2012257314 | 12/2012 |
| KR | 1020080092802 | 10/2008 |
| KR | 10-1116549 | 2/2012 |
| TW | 476205 B | 2/2002 |
| WO | 00/62435 | 10/2000 |
| WO | 0062449 A1 | 10/2000 |
| WO | 01/52574 | 7/2001 |
| WO | 02/33853 | 4/2002 |
| WO | 03/105519 A1 | 12/2003 |
| WO | 2004/032391 | 4/2004 |
| WO | 2004/056142 | 7/2004 |
| WO | 2004/079542 | 9/2004 |
| WO | 2005/006829 | 1/2005 |
| WO | 2005012010 | 2/2005 |
| WO | 2005013515 | 2/2005 |
| WO | 2005/029813 | 3/2005 |
| WO | 2005/050917 | 6/2005 |
| WO | 2005/064962 | 7/2005 |
| WO | 2005/120104 | 12/2005 |
| WO | WO 2006/009714 * | 1/2006 ............. H04L 1/100 |
| WO | WO2006/009714 A1 | 1/2006 |
| WO | 2006/016784 | 2/2006 |
| WO | 2006/029054 | 3/2006 |
| WO | 2007/023366 | 3/2007 |
| WO | 2007/023812 | 3/2007 |
| WO | 2007/025138 | 3/2007 |
| WO | 2007/052753 A1 | 5/2007 |
| WO | WO2007/052098 A3 | 5/2007 |
| WO | 2007073118 A1 | 6/2007 |
| WO | 2007097670 A1 | 8/2007 |
| WO | 2007/123351 | 11/2007 |
| WO | 2007/125462 | 11/2007 |
| WO | WO2008/076991 A2 | 6/2008 |
| WO | WO2008/108143 | 9/2008 |
| WO | 2008/137421 | 11/2008 |
| WO | 2009/062302 | 5/2009 |
| WO | 2009/062303 A1 | 5/2009 |
| WO | WO2009/062302 | 5/2009 |
| WO | 2009088858 | 7/2009 |
| WO | 2009/104086 | 8/2009 |
| WO | 2010/006204 | 1/2010 |
| WO | 2011079379 | 7/2011 |

OTHER PUBLICATIONS

3GPP Organizational Partners, 3GPP TS 25.331 v8.7.0, Sections 6.3. 8.1. 14.2, 8.3.1.2, 13.2, http://www.3gpp.org/ftp/Specs/archive/25_series/25.331/25331-870.zip (4 pages).
3GPP TSG-RAN WG2 Meeting #63 R2-084647, Aug. 18-22, 2008 (14 pages).
3rd Generation Partnership Project; Technical Specification Group Radio Access Network; Radio Resource Control (RRC); Protocol Specification (Release 8); 3GPP TS 25.331 V8.8.0 (Sep. 2009) (1697 pages).
Canadian Office Action for Application No. 2,661,592 dated Novenber 14, 2011 (3 pages).
Communication from EPO regarding EP Application P44025EP1/GVR dated Dec. 15, 2011 (7 pages).
Communication from the EPO for related European Application 07121138.7-2412 dated Aug. 8, 2011.
Communication from the EPO regarding related European Application 10184515.4-2412 dated Aug. 8, 2011.
EP Office Action for EP Application No. 10 184 515.4 dated Dec. 15, 2011 (7 pages).
Examination Report regarding EP Application No. 11160318.9 dated Nov. 15, 2011.
Extended Search Report for EP Application No. 11160318.9 dated Jun. 24, 2011 (5 pages).
KIPO Notice of Decision for Patent Application No. 10-2010-7012925 dated Nov. 30, 2011 with translation (4 pages).
Notice of Allowance for U.S. Appl. No. 13/244,792 dated Nov. 28, 2011 (19 pages).
Office Action for U.S. Appl. No. 12/844,302 dated Nov. 23, 2011 (16 pages).
Office Action for U.S. Appl. No. 11/467,309 dated Nov. 14, 2011 (26 pages).
Office Action for U.S. Appl. No. 11/467,309 dated Nov. 14, 2011 (28 pages).
Office Action for U.S. Appl. No. 12/107,514 dated Nov. 10, 2011 (13 pages).
Office Action for U.S. Appl. No. 12/195,018 dated Oct. 6, 2011 (21 pages).
Office Action for U.S. Appl. No. 12/953,049 dated Dec. 22, 2011 (19 pages).
Office Action for U.S. Appl. No. 13/244,749 dated Dec. 21, 2011 (29 pages).
Office Action for U.S. Appl. No. 13/244,761 dated Dec. 15, 2011 (35 pages).

(56) References Cited

OTHER PUBLICATIONS

Office Action for U.S. Appl. No. 13/244,849 dated Dec. 15, 2011 (26 pages).
3GPP TS 23.203v8.7.0; 3rd Generation Partnership Project; Technical Specification Group Services and System Aspects; Policy and Charging Control Architecture; Release 8; Sep. 2009; 114 pgs.
3GPP TS 23.401v8.7.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Sep. 2009; 234 pgs.
3GPP TS 36.321v8.7.0; 3rd Generation Partnership Project; Technical Specification Group Radio Access Network; Evolved Universal Terrestrial Radio Access (E-UTRA) Medium Access Control (MAC) Protocol Specification; Release 8; Sep. 2009; 47 pgs.
3GPP TS 36.300v8.9.0; 3rd Generation Partnership Project; Technical Specification Group Radio Access Network; Evolved Universal Terrestrial Radio Access (E-UTRAN) and Evolved Universal Terrestrial Radio Access Network (E-UTRAN); Overall Description; Stage 2; Release 8; Jun. 2009; 159 pgs.
3GPP TS 36.304v8.6.0; 3rd Generation Partnership Project; Technical Specification Group Radio Access Network; Evolved Universal Terrestrial Radio Access (E-UTRA); User Equipment (UE) Procedures in Idle Mode; Release 8; Jun. 2009; 30 pgs.
3GPP TS 36.331v8.6.0; 3rd Generation Partnership Project; Technical Specification Group Radio Access Network; Evolved Universal Terrestrial Radio Access (E-UTRA) Radio Resource Control (RRC); Protocol Specification; Release 8; Jun. 2009; 207 pgs.
Chairman; Title: LTE CP Session Report; 3GPP TSG RAN WG2 #63bis; R2-085921; Prague, Czech Republic; Sep. 29-Oct. 3, 2008; 38 pgs.
Qualcomm Europe; Title: Introduction of Signalling Connection Release Indication; 3GPP TSG-RAN WG2 meeting #63bis; R2-085584; Prague, Czech Republic; Sep. 29-Oct. 3, 2008; 5 pgs.
Research in Motion Limited, AT&T; Title: Fast Dormancy; A way forward; 3GPP TSG-RAN2 Meeting #63bis; R2-085134; Prague, Czech Republic; Sep. 29-Oct. 3, 2008; 13 pgs.
Vodafone, Rim; Huawei; Title: UE "Fast Dormancy" Behaviour; 3GPP TSG-RAN WG2 Meeting #60; R2-074848; Nov. 5-9, 2007; Jeju, South Korea; 9 pgs.
3GPP Technical Specification Group Radio Access Network; Rdio Resource Control (RRC); Protocol Specification (Release 9); 3GPP TS 25.331 v9.0.0 (Sep. 2009) Section 8.1.14 (pp. 142-144) Sections 13.1 and 13.2 (pp. 1437-1439).
Australian Examiner's Report for AU Application No. 2010202720 dated Feb. 3, 2012 (16 pages).
EP Intention to Grant EP Application No. 07121138.7 dated Jan. 26, 2012 (66 pages).
Office Action for U.S. Appl. No. 12/195,018 dated Feb. 10, 2012 (14 pages).
Office Action for U.S. Appl. No. 12/844,302 dated Feb. 15, 2012 (9 pages).
Office Action for U.S. Appl. No. 13/244,765 dated Feb. 15, 2012 (22 pages).
Second Chinese Office Action for Chinese Application No. 200710137906.8 dated Feb. 2, 2012 with translation (7 pages).
Universal Mobile Telecommunications System (UMTS); Radio Resource Control (RRC); Protocol specification (3GPP TS 25.331 version 8.8.0 Release 8) (Oct. 2009) Section 8.1.14 (pp. 141-143) and Sections 13.1 and 13.2 (pp. 1430-1432).
PCT Partial International Search Report; PCT Application No. PCT/US2009/063912; Feb. 17, 2010; 9 pgs.
European Examination Report; EP Application No. 08154976.8-1249; Aug. 10, 2009; 4 pgs.
EP Examination Report; EP Application No. 07121138.7-2412; Sep. 7, 2009; 1 pg.
EP Examination Report; EP Application No. 06118909.8-2412; Jul. 30, 2009; 3 pgs.

PCT International Search Report and Written Opinion of the International Searching Authority; Canadian PCT Application No. PCT/CA2008/02000; Feb. 13, 2009; 10 pgs.
PCT International Search Report and Written Opinion of the International Searching Authority; Canadian PCT Application No. PCT/CA2008/02001; Feb. 2, 2009; 10 pgs.
PCT International Search Report and Written Opinion of the International Searching Authority; Canadian PCT Application No. PCT/CA2008/02002; Jan. 15, 2009; 10 pgs.
European Search and Examination Report; EP Application No. 08154976.8-1249; Sep. 3, 2008; 7 pgs.
Research in Motion Limited; 3GPP TSG-RAN WG2 Meeting #63; Title: Fast Dormancy: A Way Forward; R2-084647; Jeju, South Korea; Aug. 18-22, 2008; 14 pgs.
Nokia Corporation; 3GPP TSG-RAN-WG2 Meeting #62bis; Title: Fast Dormancy Alternatives; R2-083626; Warsaw, Poland, Jun. 30-Jul. 4, 2008; 11 pgs.
EP Examination Report; EP Application No. 0618909.8-2412; Jun. 25, 2008; 3 pgs.
EP Examination Report; EP Application No. 06118909.8-2412; Nov. 12, 2007; 4 pgs.
3GP TS 25.331v7.0.0; 3rd Generation Partnership Project; Technical Specification Group Radio Access Network; Radio Resource Control (RRC); Protocol Specification; Release 7; Section 8.1.14; Mar. 2006; 4 pgs.
EP Search and Examination Report; EP Application No. 06118909.8-2416; Nov. 24, 2006; 8 pgs.
PCT International Search Report; PCT Application No. PCT/US2009/063912; May 3, 2010; 6 pgs.
PCT Written Opinion of the International Searching Authority; PCT Application No. PCT/US2009/063912; May 3, 2010; 22 pgs.
"3rd Generation Partnership Project 2; Data Service Options for Spread Spectrum Systems," 3GPP2 C.S0017-0, Version 5.0, Feb. 17, 2003 (70 pgs.).
"3rd Generation Partnership Project 2; Data Service Options for Spread Spectrum Systems: Introduction and Service Guide," 3GPP2 C.S0017-001-A, Version 1.0, Jun. 11, 2004 (22 pgs.).
"3rd Generation Partnership Project 2; Data Service Options for Spread Spectrum Systems: Radio Link Protocol Type 3," 3GPP2 C.S0017-010-A, Version 2.0, Sep. 2005 (56 pgs.).
"3rd Generation Partnership Project 2; Data Service Options for Spread Spectrum Systems: Service Options 33 and 66," 3GPP2 C.S0017-012-A, Version 2.0, May 2006 (70 pgs.).
"3rd Generation Partnership Project 2; Upper Layer (Layer 3) Signaling Standard for cdma2000 Spread Spectrum Systems Release D," 3GPP2 C.S0005-D, Version 1.0, Feb. 2004 (2247 pgs.).
"3rd Generation Partnership Project; Technical Specification Group Radio Access Network; User Equipment (UE) procedures in idle mode and procedures for cell reselection in connected mode (Release 7)," 3GPP TS 25.304 V7.1.0 (Dec. 2006) (38 pgs.).
"3rd Generation Partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401 V8.0.0 (Dec. 2007) (167 pages).
"3rd Generation Partnership Project; Technical Specification Group Services and System Aspects; Policy and charging control architecture (Release 8)" 3GPP TS 23.203 V8.1.1 (Mar. 2008) (87 pgs.).
"3rd Generation Partnership Project2; Upper Layer (Layer 3) Signaling Standard for cdma2000 Spread Spectrum Systems Release D," 3GPP2 C.S0005-D, Version 2.0, Sep. 6, 2005 (2367 pgs.).
"Digital Cellular Telecommunications System (Phase 2+)"; ETSI Standards European Telecommunications Standards Institute, Sophia-Antipo, FR, vol. 3-SA2, No. V6110, Dec. 2005, XP014032437 (17 pgs.).
3GPP TS 25.331 V5.16.0 (Mar. 2006) (1045 pgs.).
3GPP TSG-RAN WG2 Meeting #69; R2101726; San Francisco, CA, Feb. 22-26, 2010 (6 pages).
3GPP TSG-RAN WG2#67bis; R2-096027; Miyazaki, Japan, Oct. 12-16, 2009 (4 pages).
3GPP TSG-RAN WG2#68; R2096624; Jeju, South Korea, Nov. 9-13, 2009 (8 pages).

(56) References Cited

OTHER PUBLICATIONS

3GPP TSG-RAN2 Meeting #67; R2-094792; Shenzhen, China, Aug. 24-28, 2009 (10 pages).
3GPP TSG-RAN2 Meeting #69; R2101440; San Francisco, CA, Feb. 22-26, 2010 (18 pages).
3GPP TSG-RAN2 Meeting #69; R2101441; San Francisco, CA Feb. 22-26, 2010 (20 pages).
3GPP: "Radio resource control (RRC) protocol specification V7.0.0," 3GPP TS25.331 V7.0.0, (Mar. 2006), (1,249 pgs.).
3GPP: Radio Resource Control Protocol Specification for UE-UTRAN radio interface, 3GPP TS 25.331 V6.8.0 (Dec. 2005) (1,174 pgs.).
3rd Generation Partnership Project 2 "3GPP2", "Data Service Options for Spread Spectrum Systems: Service Options 33 and 66," 3GPP2 C.S0017-012-A, Version 1.0, Jun. 11, 2004 (70 pgs.).
3rd Generation Partnership Project 2 "3GPP2", Upper Layer (Layer 3) Signaling Standard for cdma2000 Spread Spectrum Systems, Release 0, 3GPP2 C.S0005-0, Version 3.0, Jun. 15, 2000 (1168 pgs.).
Australian First Report for AU Application No. 2007202206, dated Sep. 2, 2008, (this reference relates to U.S. Appl. No. 11/464,380) (7 pgs.).
Australian First Report for AU Appplication No. 2006252042, dated Apr. 9, 2008, (this reference relates to U.S. Appl. No. 11/302,263) (2 pgs.).
Australian Section Report of AU Application No. 2007202206, dated Sep. 30, 2009, (this reference relates to U.S. Appl. No. 11/464,380) (1 pg.).
Canadian Office Action for CA Application 2,571,101, dated Mar. 16, 2010, (this reference relates to U.S. Appl. No. 11/302,263) (4 pgs.).
Canadian Office Action for Canadian Application 2,589,373 dated Feb. 22, 2011 (5 pages).
Chinese First Office Action for Chinese Application No. 200610064329.X, dated Feb. 6, 2009, (including translation) (this reference relates to U.S. Appl. No. 11/302,263) (18 pgs.).
Chinese Office Action for Application No. 2007101379068, dated Apr. 25, 2011 (with translation) (13 pages.).
Chinese Second Office Action for Chinese Application No. 200610064329.X, dated Feb. 24, 2010, (including translation) (this reference relates to U.S. Appl. No. 11/302,263) (18pgs.).
EP Communication for EP Application 07121138.7 dated Oct. 19, 2010 (8 pages).
EP Communication for EP Application No. 05112183.8 dated Sep. 7, 2009 (3 pgs.).
EP Extended Search Report dated Nov. 19, 2010 for EP Application No. 10184515.4 (7 pages).
EP Extended Search Report for EP Application 06119590.5 dated Mar. 20, 2007 (11 pages).
EP Search Report for EP Application 06119590.5 dated Oct. 25, 2007 (7 pages).
EP Search Report for EP Application 10183886.0 dated Nov. 15, 2010 (3 pages).
EP Search Report for EP Application No. 05112183.8 dated May 3, 2007 (7 pgs.).
European Search Report for Application No. 10174218.7 dated Jun. 21, 2011 (7 pages).
Extended European Search Report for EP 09180936.8, dated May 20, 2010 (9 pgs.).
Extended European Search Report for EP 10170815.4, dated Nov. 2, 2010 (5 pgs.).
Extended European Search Report for EP Application 08154976.8 dated Sep. 3, 2008 (7 pages).
Extended European Search Report for EP Application No. 07121138.7, dated May 16, 2008 (this reference relates to U.S. Appl. No. 11/454,380) (10 pgs.).
Extended European Search Report for EP Application No. 08849315.0 dated Jan. 18, 2011 (8 pages).
Extended European Search Report for EP Application No. 08849731.8 dated Jan. 18, 2011 (7 pages).
Extended European Search Report for EP Application No. 10184515, dated Nov. 19, 2010, (this refrence relates to U.S. Appl. No. 11/454,380) (7 pages).
Japanese Final Office Action for JP Application No. 2006-335943, dated Dec. 3, 2009 (including translation), (this reference relates to U.S. Appl. No. 11/302,263) (6 pgs.).
Japanese Office Action for JP Application No. 2006-335943, dated Jun. 19, 2009 (including translation), (this reference relates to U.S. Appl. No. 11/302,263) (10 pgs.).
JP Office Action for JP Application No. 2007-131146 dated Sep. 30, 2010 (7 pgs.).
Korean Notice Requesting Submission of Opinion for Korean Application No. 10-2006-0128027 (including translation), dated Nov. 26, 2007 (this reference relates to U.S. Appl. No. 11/302,263) (8 pgs.).
Korean Notice Requesting Submission of Opinion for Korean Application No. 10-2006-0128027 (including translation), dated Aug. 28, 2008 (this reference relates to U.S. Appl. No. 11/302,263) (4 pgs.).
Korean Office Action for Korean Application No. 10-2010-7012701 dated Jul. 11, 2011 (11 pages including translation).
Korean Office Action for Korean Application No. 10-2010-7012925 dated Jul. 11, 2011 (6 pages including translation).
Notice of Allowance for U.S. Appl. No. 11/302,263 dated Feb. 28, 2011 (15 pages).
Notice of Allowance for U.S. Appl. No. 12/270,522 dated Mar. 10, 2011 (34 pages).
Office Action for U.S. Appl. No. 11/467,309 dated Jan. 21, 2010 (25 pages).
Office Action for U.S. Appl. No. 11/467,309 dated Jul. 20, 2010 (25 pages).
Office Action for U.S. Appl. No. 11/467,309 dated Jun. 12, 2009 (25 pages).
Office Action for U.S. Appl. No. 12/270,562 dated Mar. 10, 2011 (19 pages).
Office Action for U.S. Appl. No. 11/467,309 dated Jun. 3, 2011 (21 pages).
Office Action for U.S. Appl. No. 12/107,514 dated Apr. 14, 2011 (38 pages).
Office Action for U.S. Appl. No. 12/195,018 dated Apr. 20, 2011 (33 pages).
Office Action for U.S. Appl. No. 12/195,018 dated Jan. 5, 2011 (14 pages).
Office Action for U.S. Appl. No. 12/270,562 dated Apr. 7, 2011 (19 pages).
Office Action for U.S. Appl. No. 12/844,302 dated Mar. 25, 2011 (27 pages).
PCT Search Report and Written Opinion for PCT Application No. PCT/CA2010/002031 dated Apr. 12, 2011 (8 pages).
PCT Search Report and Written Opinion for PCT Application No. PCT/EP2010/064859 dated Feb. 9, 2011 (17 pages).
PCT Search Report and Written Opinion for PCT Application No. PCT/EP2010/068065 dated Feb. 11, 2011 (17 pages).
PCT Search Report for Application PCT/CA2007/001497 dated Dec. 18, 2008 (9 pages).
PCT Search Report for Application PCT/US2009/063912 dated Feb. 17, 2010 (9 pages).
PCT Written Opinion and Search Report for Application PCT/US2009/063912 dated Apr. 13, 2010 (22 pages).
PCT Written Opinion for Application PCT/CA2007/001497 dated Dec. 12, 2007 (12 pages).
SDO Review Comment Form, SP-3-4617.12-UGR (TIA-707-B.12) C.P0017.12-A (5 pgs.).
Summons to Attend Oral Proceedings for EP Application 08154976.8 dated Jan. 28, 2011 (10 pages).
U.S. Appl. No. 12/649,461, filed Dec. 30, 2009 (87 pages).
U.S. Appl. No. 12/897,945, filed Oct. 5, 2010 (144 pages).
U.S. Appl. No. 12/897,959, filed Oct. 5, 2010 (144 pages).
U.S. Appl. No. 12/953,049, filed Nov. 23, 2010 (146 pages).
U.S. Appl. No. 12/953,144, filed Nov. 23, 2010 (178 pages).
U.S. Appl. No. 12/953,223, filed Nov. 23, 2010 (146 pages).
Vodafone, Rim; Huawei; Title: UE "Fast Dormancy" Behaviour; 3GPP TSG-RAN WG2 Meeting #60; R2-075251; Nov. 5-9, 2007, Jeju, South Korea, (12 pgs.).

(56) References Cited

OTHER PUBLICATIONS

3GPP TSG RAN WG#2 Meeting #67; R2-094437; Shenzhen, People's Republic of China, Aug. 24-28, 2009 (56 pages).
Canadian Office Action for Canadian Patent Application No. 2,571,101, dated Apr. 30, 2012 (4 pages).
Canadian Office Action for Canadian Patent Application No. 2,589,373, dated May 31, 2012 (3 pages).
Canadian Office Action for Canadian Patent Application No. 2,661,592, dated Jun. 18, 2012 (5 pages).
Canadian Office Action for Canadian Patent Application No. 2,705,477, dated Jul. 20, 2012 (4 pages).
Chinese First Office Action for Chinese Patent Application No. 200880124414.8, dated Aug. 3, 2012 (10 pages).
Chinese First Office Action for Chinese Patent Application No. 200880124457.6, dated Aug. 2, 2012 (26 pages).
Chinese Third Office Action for Chinese Patent Application No. 200710137906.8, dated Aug. 27, 2012 (12 pages).
European Intention to Grant for European Patent Application No. 10183886.0, dated Apr. 13, 2012 (5 pages).
European Communication for European Patent Application No. 10798525.1, dated Jul. 19, 2012 (2 pages).
European Communication in European Patent Application No. 10184515.4, dated May 22, 2012 (9 pages).
European Examination Report for European Patent Application No. 08849315.0, dated Apr. 19, 2012 (5 pages).
European Examination Report for European Patent Application No. 08849731.8, dated Apr. 19, 2012 (5 pages).
International Preliminary Report on Patentability, for International Application No. PCT/CA2010/002031, dated Mar. 9, 2012 (8 pages).
International Search Report and Written Opinion for International Application No. PCT/EP2010/068063, dated Mar. 25, 2011 (23 pages).
Japanese Office Action for Japanese Patent Application No. 2010-533396, dated May 29, 2012 (5 pages).
Japanese Office Action for Japanese Patent Application No. 2010-533397, dated Apr. 23, 2012 (8 pages).
Japanese Office Action for Japanese Patent Application No. 2011-083176, dated May 30, 2012 (6 pages).
Korean Office Action for Korean Patent Application No. 10-2011-7012708, dated Aug. 13, 2012 (6 pages).
Mexican Office Action for Mexican Patent Application No. MX/a/2010/005255, dated Feb. 13, 2012 (9 pages).
Mexican Office Action for Mexican Patent Application No. MX/a/2011/004888, dated Jul. 13, 2012 (7 pages).
Notice of Allowance for U.S. Appl. No. 12/195,018, dated May 2, 2012 (4 pages).
Notice of Allowance for U.S. Appl. No. 12/270,562, dated Apr. 5, 2012 (27 pages).
Notice of Allowance for U.S. Appl. No. 13/244,749, dated Jun. 25, 2012 (13 pages).
Notice of Allowance for U.S. Appl. No. 13/244,765, dated Jun. 28, 2012 (8 pages).
Notice of Decision for Patent, for Korean Patent Application No. 10-2010-7012701, dated Mar. 8, 2012 (3 pages).
Notice of Decision for Patent, for Korean Patent Application No. 10-2010-7012778, dated Mar. 26, 2012 (7 pages).
Notification of Grant of Rights for Invention Patent, in Chinese Patent Application No. 200610064329.X, dated Apr. 9, 2012 (2 pages).
Office Action for U.S. Appl. No. 11/464,380, dated Dec. 22, 2010 (19 pages).
Office Action for U.S. Appl. No. 11/464,380, dated Jul. 20, 2012 (15 pages).
Office Action for U.S. Appl. No. 12/270,562, dated Nov. 18, 2010 (21 pages).
Office Action for U.S. Appl. No. 13/244,765, dated Apr. 17, 2012 (12 pages).
Office Action for U.S. Appl. No. 13/244,849 dated Mar. 22, 2012 (18 pages).

"3rd Generation Partnership Project; Technical Specification Group Radio Access Network; Radio Resource Control (RRC); Protocol Specification (Release 8)"; 3GPP TS 25.331 V8.8.0 (Sep. 2009) (1697 pages).
3GPP TSG-RAN WG2 Meeting #60 R2-075251, Jeju, South Korea, Nov. 5-9, 2007 (13 pages).
3GPP TSG-RAN2 Meeting #64 R2-086557, Prague, Czech, Nov. 10-14, 2008 (13 pages).
Australian First Examination Report dated Feb. 3, 2012, issued in Australian Application No. 2010202720 (16 pages).
Canadian Office Action dated Jun. 21, 2012, issued in Canadian Application No. 2,705,476 (3 pages).
Canadian Office Action dated Jun. 21, 2012, issued in Canadian Patent Application No. 2,705,478 (4 pages).
Chinese First Office Action dated Aug. 2, 2012, issued in Chinese Application No. 200880124457.6 (24 pages).
Chinese First Office Action dated Oct. 31, 2012, issued in Chinese Application No. 200880124114.X (10 pages).
Chinese Second Office Action dated Jan. 30, 2013, issued in Chinese Application No. 200880124457.6 (25 pages).
Chinese Third Office Action dated Oct. 8, 2011, issued in Chinese Application No. 200610064329.X (7 pages).
European Communication dated Jan. 24, 2008, issued in European Application No. 05112183.8 (2 pages).
European Communication dated Jul. 18, 2012, issued in European Application No. 10771051.9 (2 pages).
European Communication dated Jul. 19, 2012, issued in European Application No. 10768896.2 (2 pages).
European Communication dated Jul. 25, 2012, issued in European Application No. 10790529.1 (2 pages).
European Examination Report dated Dec. 28, 2011, issued in European Application No. 08154976.8 (3 pages).
European Examination Report dated Feb. 14, 2013, issued in European Application No. 08849315.0 (6 pages).
European Examination Report dated Feb. 21, 2013, issued in European Application No. 08849731.8 (5 pages).
European Intent to Grant dated Dec. 17, 2010, issued in European Application No. 05112183.8 (41 pages).
European Intention to Grant dated Oct. 20, 2011, issued in European Application No. 10170815.4 (1 page).
Extended European Search Report dated Nov. 22, 2012, issued in European Application No. 11177172.1 (6 pages).
Extended European Search Report dated Nov. 29, 2012, issued in European Application No. 11177171.3 (7 pages).
Final Office Action dated Dec. 24, 2012, issued in U.S. Appl. No. 12/616,024 (56 pages).
Final Office Action dated Feb. 26, 2013, issued in U.S. Appl. No. 12/897,945 (13 pages).
Final Office Action dated Feb. 27, 2013, issued in U.S. Appl. No. 12/953,144 (8 pages).
Final Office Action dated Jul. 12, 2012, issued in U.S. Appl. No. 13/244,761 (26 pages).
Final Office Action dated Mar. 25, 2013, issued in U.S. Appl. No. 12/897,959 (22 pages).
Final Office Action dated Oct. 11, 2012, issued in U.S. Appl. No. 12/649,461 (19 pages).
Final Office Action dated Sep. 13, 2012, issued in U.S. Appl. No. 12/953,049 (18 pages).
Indian Office Action dated Apr. 7, 2011, issued in Indian Application No. 2672/DEL/2006 (2 pages).
Japanese Office Action dated Jun. 20, 2012, issued in Japanese Application No. 2010-533398 (9 pages).
Japanese Office Action dated Nov. 12, 2012, issued in Japanese Application No. 2011-535770 (7 pages).
Japanese Office Action dated Oct. 29, 2012, issued in Japanese Application No. 2010-085595 (6 pages).
Korean Application No. 10-2008-0092802, filed on Oct. 16, 2008, including English equivalent EP 1981224 (31 total pages).
Korean Office Action dated Feb. 26, 2013, issued in Korean Application No. 10-2011-7012708 (9 pages).
Korean Office Action dated Jan. 17, 2013, issued in Korean Application No. 10-2012-7026886 (8 pages).

(56) References Cited

OTHER PUBLICATIONS

Mexican Office Action dated Jan. 11, 2013, issued in Mexican Application No. MX/a/2010/005249 (4 pages).
Mexican Office Action dated Jan. 11, 2013, issued in Mexican Application No. MX/a/2010/005251 (4 pages).
Office Action dated Feb. 7, 2013, issued in U.S. Appl. No. 12/953,049 (8 pages).
Office Action dated Jan. 16, 2013, issued in U.S. Appl. No. 13/532,353 (23 pages).
Office Action dated Jan. 22, 2013, issued in U.S. Appl. No. 13/244,761 (10 pages).
Office Action dated Jan. 7, 2013, issued in U.S. Appl. No. 11/464,380 (12 pages).
Office Action dated Jul. 31, 2012, issued in U.S. Appl. No. 12/953,144 (30 pages).
Office Action dated Nov. 20, 2012, issued in U.S. Appl. No. 12/897,959 (42 pages).
Office Action dated Oct. 18, 2012, issued in U.S. Appl. No. 12/897,945 (34 pages).
PCT International Search Report and Written Opinion dated Feb. 11, 2011, issued in International Application No. PCT/EP2010/068064 (16 pages).
PCT International Search Report and Written Opinion dated Feb. 13, 2009, issued in International Application No. PCT/CA2008/002000 (10 pages).
PCT International Search Report and Written Opinion dated Feb. 2, 2009, issued in International Application No. PCT/CA2008/002001 (10 pages).
PCT International Search Report and Written Opinion dated Jan. 15, 2009, issued in International Application No. PCT/CA2008/002002 (10 pages).
PCT International Search Report and Written Opinion dated Jan. 21, 2013, issued in International Application No. PCT/US2012/064499 (11 pages).
PCT International Search Report and Written Opinion dated Jan. 28, 2011, issued in International Application No. PCT/EP2010/064860 (12 pages).
Taiwan Office Action dated Aug. 30, 2012, issued in Taiwan Patent Application No. 096131703 (8 pages).
Taiwan Office Action dated Jul. 29, 2011, issued in Taiwan Application No. 095146891 (5 pages).
U.S. Appl. No. 12/844,302, filed Jul. 27, 2010 (35 pages).
U.S. Appl. No. 13/546,926, filed Jul. 11, 2012 (54 pages).
U.S. Appl. No. 13/673,398, filed Nov. 9, 2012 (42 pages).
U.S. Appl. No. 13/751,369, filed Jan. 28, 2013 (142 pages).
Universal Mobile Telecommunications System (UMTS); Radio Resource Control (RRC); Protocol specification (3GPP TS 25.331 version 10.5.0 Release 10), ETSI TS 125 331 (Nov. 2011), Sections 8.1.14.1 (p. 152), 8.1.14.2 (pp. 152-154), 8.2.2.2 (pp. 166-168), 8.2.2.3 (pp. 168-185), and 8.3.1.7 (pp. 235-239).
3GPP 25.331 Radio Resource Control (RRC); Protocol Specification, V5.18.0 (Sep. 2006), pp. 12-13.
3GPP TSG-RAN WG2 Meeting #68, R2-097173, Jeju, South Korea, Nov. 9-13, 2009 (5 pages).
3GPP TSG-RAN WG2 Meeting #68, R2-097174, Jeju, South Korea, Nov. 9-13, 2009 (8 pages).
3GPP TSG-RAN WG2 Meeting #69, R2-101710, San Francisco, California, Feb. 22-26, 2010 (6 pages).
3GPP TSG-RAN WG2 Meeting #69, R2-101726, San Francisco, California, Feb. 22-26, 2010 (6 pages).
Australian First Examination Report dated Feb. 13, 2013, issued in Australian Application No. 2009313191 (3 pages).
Chinese Fourth Office Action dated Mar. 18, 2013, issued in Chinese Application No. 200710137906.8 (7 pages).
European Examination Report dated Sep. 7, 2009, issued in European Application No. 07121138.7 (1 page).
Extended European Search Report dated Apr. 12, 2013, issued in European Application No. 13152938.0 (10 pages).
Extended European Search Report dated Apr. 12, 2013, issued in European Application No. 13152942.2 (10 pages).
Extended European Search Report dated Apr. 16, 2013, issued in European Application No. 13159334.5 (10 pages).
Office Action dated Apr. 19, 2013, issued in U.S. Appl. No. 13/157,724 (46 pages).
Chinese Second Office Action dated Jun. 5, 2013, issued in Chinese Application No. 200880124414.8, (8 pages).
European Examination Report dated Aug. 10, 2009, issued in European Application No. 08154976.8 (4 pages).
Final Office Action dated Aug. 15, 2013, issued in U.S. Appl. No. 13/244,761, (21 pages).
Final Office Action dated Aug. 30, 2013, issued in U.S. Appl. No. 12/953,049, (19 pages).
Final Office Action dated Jun. 26, 2013, issued in U.S. Appl. No. 13/532,353 (15 pages).
Final Office Action dated May 23, 2013, issued in U.S. Appl. No. 11/464,380 (22 pages).
Office Action dated Jun. 26, 2013, issued in U.S. Appl. No. 12/844,302 (19 pages).
Taiwan Office Action dated May 20, 2013, issued in Taiwan Application No. 096131703 (19 pages).
3GPP TS 25.331, v6.7.0, Sep. 2005 (9 pages).
3GPP TSG RAN WG2, #46bis, Tdoc R2-051493, Siemens, "Stored Configurations in UTRAN—Principles and Mechanism", Athens, Greece, May 8-13, 2005 (7 pages).
3GPP TSG RAN-WG#2 Meeting #17, Tdoc R2-002255, Sophia Antipolis, France, Nov. 13-17, 2000 (19 pages).
3GPP TSG-RAN WG2 Meeting #11, R2-000660, Turin, Italy, Feb. 28-Mar. 3, 2000 (9 pages).
3GPP TSG-RAN WG2, #59, R2-073707, Motorola, "DRX for NRT and RT services", Athens, Greece, Aug. 20-24, 2007 (1 page).
Australian Examination Report dated Nov. 18, 2013, issued in Australian Application No. 2010323195, (4 pages).
Australian Examination Report dated Nov. 18, 2013, issued in Australian Application No. 2012207044, (4 pages).
Australian First Examination Report dated Sep. 26, 2013, issued in Australian Application No. 2010321204, (4 pages).
Canadian Office Action dated Oct. 11, 2013, issued in Canadian Application No. 2,571,101, (7 pages).
Chinese Fourth Office Action dated Oct. 11, 2013, issued in Chinese Application No. 200880124457.6, (3 pages).
Chinese Second Office Action dated Nov. 5, 2013, issued in Chinese Application No. 200980144537.2, (10 pages).
European Examination Report dated Oct. 30, 2013, issued in European Application No. 09180936.8, (7 pages).
GPP TSG-RAN WG2 #63 bis, R2-085726, Prague, CZ, Sep. 29-Oct. 3, 2008 (6 pages).
Indonesian Office Action dated Nov. 15, 2013, issued in Indonesian Application No. W00201202451, (4 pages).
Japanese Office Action dated Aug. 27, 2013, issued in Japanese Application No. 2010-085595, (9 pages).
Japanese Office Action dated Aug. 7, 2013, issued in Japanese Application No. 2012-539244, (5 pages).
Japanese Office Action dated Aug. 7, 2013, issued in Japanese Application No. 2012-539245, (5 pages).
Japanese Office Action dated Jul. 25, 2013, issued in Japanese Application No. 2012-539363, (5 pages).
Japanese Office Action dated Nov. 25, 2013, issued in Japanese Application No. 2012-185846, (8 pages).
Japanese Office Action dated Nov. 25, 2013, issued in Japanese Application No. 2012-539363, (8 pages).
Japanese Office Action dated Nov. 26, 2013, issued in Japanese Application No. 2012-241734, (7 pages).
Japanese Office Action dated Nov. 28, 2013, issued in Japanese Application No. 2012-241739, (8 pages).
Japanese Office Action dated Sep. 3, 2013, issued in Japanese Application No. 2012-549266, (7 pages).
Korean Office Action dated Oct. 18, 2013, issued in Korean Application No. 10-2011-7021074, (6 pages).
Korean Office Action dated Oct. 18, 2013, issued in Korean Application No. 10-2011-7021393, (6 pages).
Korean Office Action dated Oct. 25, 2013, issued in Korean Application No. 10-2012-7016424, (9 pages).

(56) References Cited

OTHER PUBLICATIONS

Korean Office Action dated Oct. 28, 2013, issued in Korean Application No. 10-2012-7016425, (9 pages).
Korean Office Action dated Oct. 29, 2013, issued in Korean Application No. KR-10-2012-7016426, (8 pages).
Korean Office Action dated Oct. 29, 2013, issued in Korean Application No. KR-10-2012-7016427, (7 pages).
Mexican Notice of Allowance dated Nov. 8, 2013, issued in Mexican Application No. MX/a/2013/003651, (6 pages).
Mexican Notice of Allowance dated Sep. 6, 2013, issued in Mexican Application No. MX/A/2012/009440, (8 pages).
Mexican Third Office Action dated May 30, 2012, issued in Mexican Application No. MX/a/2010/005255, (7 pages).
Notice of Allowance dated Nov. 5, 2013, issued in U.S. Appl. No. 12/844,302, (26 pages).
Office Action dated Oct. 15, 2013, issued in U.S. Appl. No. 13/532,353, (12 pages).
TSG-RAN Working Group 2 (Radio layer 2 and Radio layer 3), R2-002259, Ericsson, "Handling of "out of service" area", Sophia Antipolis, France, Nov. 13-17, 2000 (3 pages).
Canadian Office Action dated Feb. 27, 2014, issued in Canadian Application No. 2,589,373, (3 pages).
European Examination Report dated Jan. 3, 2014, issued in European Application No. 09752972.1, (8 pages).
Final Office Action dated Feb. 10, 2014, issued in U.S. Appl. No. 13/921,728, (16 pages).
Final Office Action dated Feb. 13, 2014, issued in U.S. Appl. No. 13/532,353, (14 pages).
Indonesian Office Action dated Dec. 23, 2013, issued in Indonesian Application No. W00201202454, (6 pages).
Indonesian Office Action dated Feb. 27, 2014, issued in Indonesian Application No. W00201202452, (4 pages).
Indonesian Office Action dated Feb. 27, 2014, issued in Indonesian Application No. W00201102002, (4 pages).
Japanese Office Action dated Dec. 6, 2013, issued in Japanese Application No. 2013-023208, (4 pages).
Korean Final Office Action dated Feb. 3, 2014, issued in Korean Application No. 10-2012-7016427, (3 pages).
Korean Notice of Allowance dated Feb. 5, 2014, issued in Korean Application No. 10-2011-7021074, (5 pages).
Korean Notice of Allowance dated Feb. 7, 2014, issued in Korean Application No. 10-2011-7021393, (7 pages).
Korean Office Action dated Jan. 24, 2014, issued in Korean Application No. KR-10-2011-7021391, (3 pages).
Office Action dated Dec. 20, 2013, issued in U.S. Appl. No. 13/584,381, (36 pages).
Office Action dated Feb. 10, 2014, issued in U.S. Appl. No. 12/953,223, (53 pages).
Office Action dated Jan. 2, 2014, issued in U.S. Appl. No. 13/673,398, (33 pages).
Office Action dated Jan. 30, 2014, issued in U.S. Appl. No. 11/467,309, (57 pages).
Office Action dated Mar. 6, 2014, issued in U.S. Appl. No. 12/953,049, (9 pages).
Office Action dated Mar. 6, 2014, issued in U.S. Appl. No. 13/244,761, (8 pages).
Australian Examination Report dated Jul. 8, 2013, issued in Australian Application No. 2010320843, (3 pages).
Australian First Examination Report dated Jul. 30, 2013, issued in Australian Application No. 2010321205, (2 pages).
Canadian Office Action dated Aug. 9, 2013, issued in Canadian Application No. 2,743,128, (3 pages).
Chinese Third Office Action dated Jul. 11, 2013, issued in Chinese Application No. 200880124457.6, (29 pages).
Final Office Action dated Sep. 27, 2013, issued in U.S. Appl. No. 13/157,724, (9 pages).
Japanese Office Action dated Aug. 2, 2013, issued in Japanese Application No. 2012-539362, (9 pages).
Notice of Allowance dated Sep. 30, 2013, issued in U.S. Appl. No. 11/464,380, (20 pages).
Office Action dated Sep. 17, 2013, issued in U.S. Appl. No. 13/921,728, (25 pages).
Australian Second Examination Report dated Jul. 9, 2014, issued in Australian Application No. 2010321205, (3 pages).
Canadian Office Action dated May 13, 2014, issued in Canadian Application No. 2,781,630, (3 pages).
Canadian Office Action dated May 20, 2014, issued in Canadian Application No. 2,781,558, (2 pages).
Canadian Office Action dated May 8, 2014, issued in Canadian Application No. 2,781,509, (2 pages).
Canadian Office Action dated May 8, 2014, issued in Canadian Application No. 2,785,826, (2 pages).
Canadian Office Action dated May 9, 2014, issued in Canadian Application No. 2,781,562, (3 pages).
Chinese First Office Action dated Jun. 5, 2014, issued in Chinese Application No. 201210213644.X, (5 pages).
European Communication—Invitation Pursuant to Article 94(3) and Rule 71(1) EPC dated Apr. 14, 2014, issued in European Application No. 08849315.0, (4 pages).
European Examination Report dated Apr. 30, 2014, issued in European Application No. 08849731.8, (5 pages).
Extended European Search Report dated Jul. 16, 2014, issued in European Application No. 13181054.1, (8 pages).
Final Office Action dated Apr. 8, 2014, issued in U.S. Appl. No. 13/673,398, (10 pages).
Final Office Action dated Jul. 22, 2014, issued in U.S. Appl. No. 12/953,223, (12 pages).
Final Office Action dated May 13, 2014, issued in U.S. Appl. No. 11/467,309, (19 pages).
Korean Office Action dated Apr. 15, 2014, issued in Korean Application No. 10-2012-7016423, (3 pages).
Mexican Office Action dated May 12, 2014, issued in Mexican Application No. MX/a/2012/005875, (6 pages).
Notice of Allowance dated Jul. 8, 2014, issued in U.S. Appl. No. 13/584,381, (19 pages).
Office Action dated Apr. 25, 2014, issued in U.S. Appl. No. 13/244,849, (32 pages).
Office Action dated Apr. 28, 2014, issued in U.S. Appl. No. 12/649,461, (27 pages).
Office Action dated Jul. 14, 2014, issued in U.S. Appl. No. 13/587,073, (34 pages).
Office Action dated Jun. 18, 2014, issued in U.S. Appl. No. 12/897,945, (33 pages).
Office Action dated Jun. 18, 2014, issued in U.S. Appl. No. 12/897,959, (26 pages).
Office Action dated Jun. 18, 2014, issued in U.S. Appl. No. 12/953,049, (18 pages).
Office Action dated Jun. 19, 2014, issued in U.S. Appl. No. 13/244,761, (17 pages).
Office Action dated Jun. 9, 2014, issued in U.S. Appl. No. 13/532,353, (5 pages).
Office Action dated Jun. 9, 2014, issued in U.S. Appl. No. 13/921,728, (5 pages).
Partial European Search Report dated Jun. 13, 2014, issued in European Application No. 13177318.6, (5 pages).
Taiwan Office Action dated Jun. 3, 2014, issued in Taiwanese Application No. 096131703, (9 pages).
3GPP ETSI TS 123 034, v3.3.0, Digital Cellular Telecommunications System (Phase 2+) (GSM); Universal Mobile Telecommunications System (UMTS); High Speed Circuit Switched Data (HSCSD)—Stage 2, Dec. 2000 (21 pages).
3GPP TSG SA WG 3 (Security) Meeting #11, S3-000131, Mainz, Germany, Feb. 22-24, 2000 (11 pages).
Canadian Office Action dated Aug. 21, 2014, issued in Canadian Application No. 2,743,128, (3 pages).
Chinese First Office Action dated Aug. 15, 2014, issued in Chinese Application No. 201080062007.6, (7 pages).
Korean Final Office Action dated Aug. 4, 2014, issued in Korean Application No. 10-2012-7016425, (4 pages).
Korean Office Action dated Aug. 6, 2014, issued in Korean Application No. 10-2014-7012197, (4 pages).
Mexican Notice of Allowance dated Aug. 27, 2014, issued in Mexican Application No. MX/a/2012/005871, (9 pages).

(56) References Cited

OTHER PUBLICATIONS

Notice of Allowance dated Aug. 12, 2014, issued in U.S. Appl. No. 13/157,724, (11 pages).
Notice of Allowance dated Sep. 12, 2014, issued in U.S. Appl. No. 13/673,398, (8 pages).
Notice of Allowance dated Sep. 19, 2014, issued in U.S. Appl. No. 13/532,353, (5 pages).
Notice of Allowance dated Sep. 19, 2014, issued in U.S. Appl. No. 13/921,728, (6 pages).
Notice of Allowance dated Sep. 8, 2014, issued in U.S. Appl. No. 13/244,849, (9 pages).
Talukdar et al., IEEE Xplore Digital Library, "Radio Resource Control Protocol Configuration for Optimum Web Browsing", published in Vehicular Technology Conference, 2002. Proceedings VTC 2002-Fall, IEEE 56th, vol. (3 pages).
International Preliminary Report on Patentability in International Application No. PCT/US2009/063912, issued May 10, 2011, 17 pages.
International Preliminary Report on Patentability in International Application No. PCT/EP2010/068064, issued Aug. 14, 2012, 10 pages.
International Preliminary Report on Patentability in International Application No. PCT/EP2010/068063, issued May 30, 2012, 9 pages.
International Preliminary Report on Patentability in International Application No. PCT/CA2008/00200, issued Aug. 4, 2009, 5 pages.
International Preliminary Report on Patentability in International Application No. PCT/CA2008/002002, issued May 18, 2010, 5 pages.
International Preliminary Report on Patentability in International Application No. PCT/CA2007/001497, issued Dec. 18, 2008, 7 pages.
International Preliminary Report on Patentability in International Application No. PCT/CA2008/002001, issued Dec. 3, 2009, 8 pages.
Extended European Search Report in European Application No. 13177318.6, dated Oct. 27, 2014, 11 pages.

\* cited by examiner

METHOD AND APPARATUS OF TRANSITION TO A BATTERY EFFICIENT STATE OR CONFIGURATION BY INDICATING END OF DATA TRANSMISSION IN LONG TERM EVOLUTION

CROSS-REFERENCE TO RELATED APPLICATIONS

The present application claims priority to U.S. provisional patent application No. 61/113,094, filed Nov. 10, 2008, by Takashi Suzuki, et al, entitled "Method and Apparatus of Transition to a Battery Efficient State or Configuration by Indicating End of Data Transmission in Long Term Evolution" (34476-US-PRV-4214-13200), which is incorporated by reference herein as if reproduced in its entirety.

BACKGROUND

Long Term Evolution (LTE) is a Third Generation Partnership Project (3GPP) standard for mobile network technology. The LTE describes a plurality of requirements for mobile communications systems in evolved or advanced cellular broadband technologies. Such requirements include Evolved Universal Mobile Telecommunications System (UMTS) Terrestrial Radio Access Network (E-UTRAN), which is a high-speed radio access technique to meet the increased network demands, including improving user throughputs and network capacity, reducing latency, and increasing mobility. For instance, the LTE uses an Enhanced Packet Core (EPC) network architecture to support the E-UTRAN. The EPC network architecture uses protocols such as Transmission Control Protocol (TCP)/Internet Protocol (IP) for supporting IP based services, such as voice, video, other media, and messaging, with end-to-end Quality of Service (QoS). The EPC network architecture also enables improved connections and hand-over to other fixed-line and wireless access technologies with improved mobility.

The LTE Physical Layer (PHY) uses advanced technologies, including Orthogonal Frequency Division Multiple Access (OFDMA), multiple-input and multiple-output (MIMO) data transmissions, and smart antennas to meet the network demands above. The LTE PHY uses OFDMA for downlink transmissions, for instance from a Base Station (BS) to a User Equipment (UE), which can communicate by transmitting signals throughout a geographical region known as a cell. Additionally, The LTE PHY uses Single Carrier Frequency Division Multiple Access (SC-FDMA) for uplink transmissions, for instance from the UE to the BS. The OFDMA and SC-FDMA technologies reduce the LTE and UE system complexities and increase the communication spectrum or bandwidth.

The UE may be any mobile device used in the LTE system, such as mobile telephones, personal digital assistants, handheld or laptop computers, and similar devices that have telecommunications capabilities. The UE may consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. Alternatively, the UE may be a device that has similar wireless capabilities but that is not transportable, such as desktop computers, set-top boxes, or network nodes. The UE may also be a network node, which acts on behalf of another function, such as a wireless device, and simulates or emulates the device. For example, for some wireless devices, an IP Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UE, where the remote UE represents the wireless device in the network. In some instances, the UE may be any hardware or software component that can terminate an SIP session.

In addition to the BS and UE, LTE systems may include advanced equipment, which provide services that were not possible previously, such as an enhanced node B (ENB). These devices can provide at least some of the functionalities of the BS, wireless access points, and other systems and devices some of which may be more evolved than the equivalent equipment in a traditional wireless telecommunications system. The term ENB or access device may be used herein to refer to any device, existing or advanced, that may be used to gain access to a network. Such advanced or next generation equipment may be referred to herein as long-term evolution (LTE) equipment.

The LTE includes protocols such as a Radio Resource Control (RRC) protocol, which is responsible for the assignment, configuration and release of radio resources between the UE and the BS, ENB or other access or LTE equipment. The RRC protocol is described in detail in the 3GPP TS 36.331 specifications. According to the RRC protocol, the two basic RRC modes for the UE are defined as "idle mode" and "connected mode." During the connected mode or state, the UE may exchange signals with the network and perform other related operations, while during the idle mode or state, the UE may shut down at least some of its connected mode operations. Idle and connected mode behaviors are described in details in the Third Generation Partnership Project (3GPP) specifications TS 36.304 and TS 36.331.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
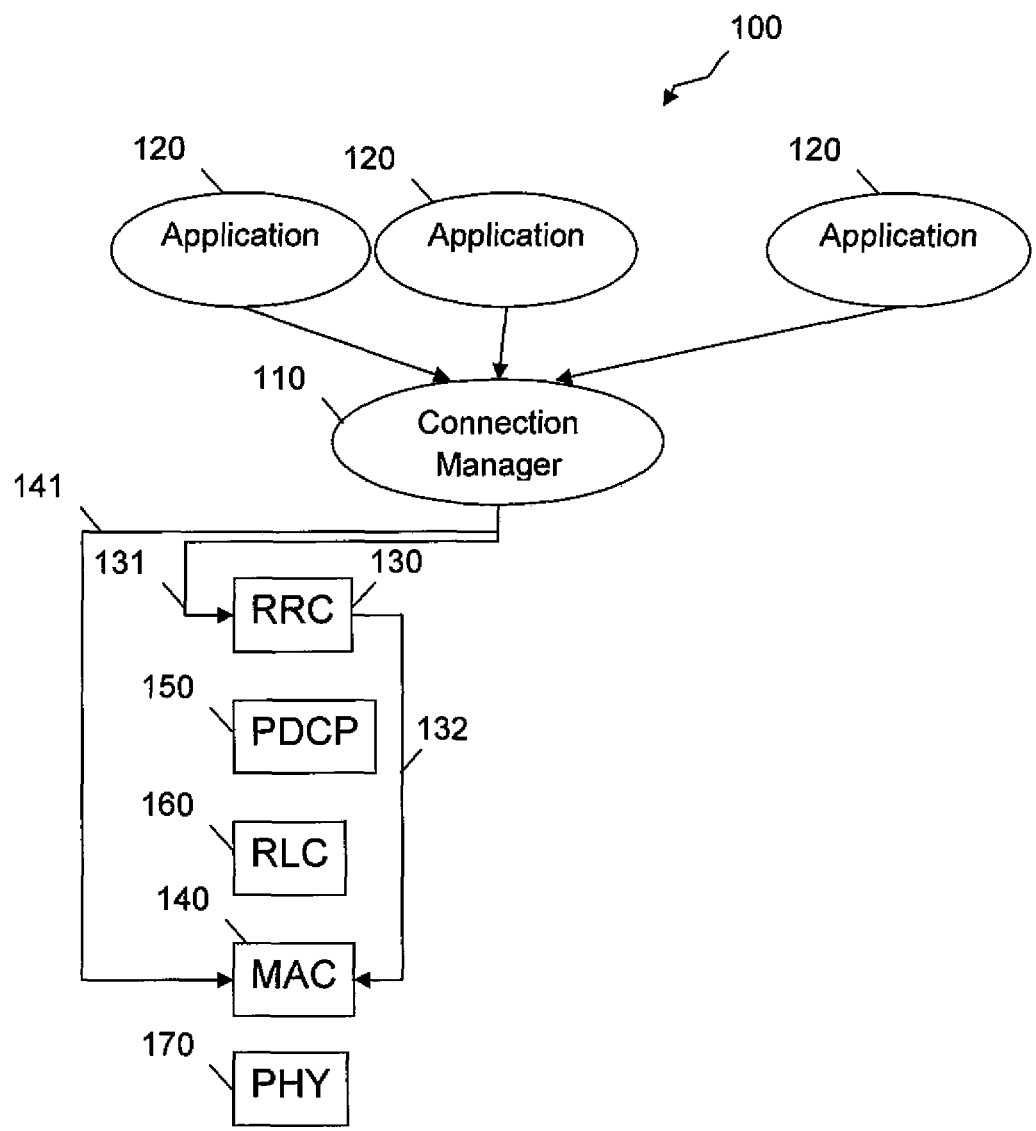
FIG. 1 is an illustration of a UE control interface for fast dormancy indication according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The UE's transition from the idle mode to the connected mode and vise-versa is typically controlled by the network or the LTE equipment in communication with the UE, such as an ENB. For instance, the network or ENB may decide when to release the RRC connection, and move the UE from one RRC state to another. The state transitions are triggered by data activity or inactivity between the UE and the network. The RRC connection is released by the network sending an RRC Connection Release message, which causes the releasing of the signal link connection and some or all of the radio resources between the UE and the network component. Since the network or ENB may not know the exact moment when the UE has completed data exchange or processing for a given application, it may keep the RRC connection for some time in anticipation of more data to/from the UE in order to reduce the latency of radio resource setup and subsequent connection set-up.

Disclosed herein is a system and method for initiating a fast dormancy (FD) procedure type at the UE to move the UE from the connected mode to the idle mode or to release some connections, or uplink transmission resources between the UE and the network. FD, FD procedure or FD indication may be used herein to refer generally to fast dormancy techniques such as, but not limited to, those proposed to UTRAN. The FD procedures herein may refer to any procedure or process that promotes improved power management and/or extended battery life by, for example, reducing the time the device spends in a particular configuration with assigned connection(s) or configured resources and moving into more energy efficient states or modes, such as idle mode. Accordingly, the UE may decide that it no longer needs at least some of the radio resources currently assigned to it based on available upper layer knowledge, such as end of applications or application contents, and may hence send an indication to the network or an ENB. In response, the network or ENB may act upon the indication by moving the UE from the connected mode to a more energy efficient states or modes, such as idle mode without waiting for further network action or an inactivity timer, which may be preset by the network, to expire by releasing at least some of the connections. Alternatively, the network or ENB may act upon the indication by releasing uplink transmission resources. For instance, the connections may be released in an explicit manner when the ENB sends a release message back to the UE. The uplink transmission resource may be released in explicit manner when the ENB transmits a reconfiguration message to release the resource or in an implicit manner when the ENB stops sending time alignment data to the UE, which may be required by the UE for maintaining uplink transmission timing. The indication may be sent at the RRC protocol layer, for instance using an RRC message, or at a medium access control (MAC) layer. MAC layer signaling may have the benefit of reducing the indication and response time between the UE and the ENB. The FD procedure may be used to improve the total power efficiency at the UE by shortening the RRC connected mode time and moving the UE to a more energy efficient states or modes, such as RRC idle mode, before a network preset time expires causing the network to change the UE resource configuration or release the UE connection. Additionally, the ED procedure may improve the total power efficiency at the UE if the network determines to keep the UE in the RRC connected mode, while reducing the number of unnecessary uplink transmissions. For example, this can be carried out by the network reconfiguring the RRC connection to remove the need for sending the sounding reference signal or, alternatively, by allowing the UE time alignment timer to expire without providing any update to the UE time alignment. Maintaining the RRC connected mode whilst reducing the required number of uplink transmissions also enables a reduction in the time required for call/session setup latency, as compared to idle mode. In addition, the FD procedure may improve further the total power efficiency at the UE since the absence of FD indication could then be used as a sign that more data transfer is likely to be required (with greater probability than in a system not using the FD procedure). This would allow, for example, some inactivity timers on the network side to be influenced, such as extended or reduced.

Specifically, the RRC protocol for LTE may support discontinuous reception (DRX) in connected mode, where the UE may switch in an alternating manner or periodically between the DRX Active Time to monitor Physical Downlink Control Channel (PDCCH) and exchange signals with the network and the non-DRX Active Time to preserve battery power. The time duration of the connected mode of the DRX cycle may be shorter than that of the idle mode. The connected mode may comprise more uplink transmissions and uplink control channel resources. For instance, the UE may be configured to periodically report downlink channel status, e.g., channel quality indicator (CQI), rank indicator (RI), and preceding matrix indicator (PMI), and sounding reference signal (SRS) for uplink channel estimation during DRX active time or connected mode but not during idle time or idle mode. Hereafter CQI, PMI, RI and SRS are referred to as channel status report. The UE may maintain the uplink transmissions during the connected mode regardless of the presence or amount of user traffic or payload. As such, the uplink transmissions may be maintained until the uplink control channel resources are released by the UE, for instance when the uplink time alignment timer in the UE is expired, when the UE receives a reconfiguration message from the network to disable the uplink transmissions, such as an RRC connection reconfiguration message, or when the UE receives a connection release message upon the expiry of the inactivity timer at the network. When the UE exchanges communications with the network at higher rates, the inactivity timer expiration time may increase, and hence the UE may remain in the connected mode for longer time durations unnecessarily.

Additionally, in connected mode, the UE may search for physical downlink control channel (PDCCH) information not only in common search areas but also in UE specific search area, which may increase processing by the UE compared to idle mode where the UE needs to search only in common areas, and hence power consumption is greater in connected mode in comparison to the idle mode. The UE may also examine, during the connected mode, more types of radio network terminal identities (RNTIs), such as cell RNTIs (C-RNTI) or Transmit Power Control-Physical Uplink Shared Channel-RNTI (TPC-PUSCH-RNTI) or Transmit Power Control-Physical Uplink Control Channel-RNTI (TPC-PUCCH-RNTI) or Semi-persistent Scheduling RNTI (SPS-RNTI). Moreover, when the UE is located closer to a cell edge, it may perform additional measurements, which may be related to neighboring cells, and report measurements to the network during the connected mode to ensure robust mobility management. Further, when the UE is transported between the cells, hand-over signaling is used during the connected mode. In contrast, the UE may change cells during the idle mode within its registered tracking areas without signaling to the network. As described above, since the UE performs more operations and hence uses more power during the connected mode in comparison to the idle mode, the FD procedure may preserve the UE's battery power by reducing the duration of the connected mode or by reducing the amount of operations or transmissions during the connected mode. Additionally, by releasing unnecessary control channel resources or connections the FD procedure may improve radio resource utilization and management in Radio Access Networks (RANs) and thus provide more resources for other active users, e.g., for UEs in connected mode with data to transmit.

FIG. 1 illustrates an embodiment of a UE control interface 100, which may be used to send the FD indication to the network. The control interface 100 may comprise a UE connection manager 110, at least one application 120, which may be running or processed at the UE. Additionally, the control interface 100 may comprise a plurality of network protocol layers, including the RRC protocol layer 130, the MAC layer 140, and other protocol or control layers which may be accessed or supported, such as a Packet Data Convergence Protocol (PDCP) layer 150, a Radio Link Control (RLC) layer 160 and a Physical layer (PHY) 170.

The UE connection manager 110 may be aware of the status of any application 120 running or scheduled for running at the UE, for instance at an application or upper layers. For example, the UE connection manager 110 may be aware of the start time, end time, process time, remaining time, or combinations thereof for at least some of the applications 120 at the UE. The applications 120 may comprise network or link management applications, network services applications, other network applications, or user applications. In one embodiment, the UE connection manager 110 may also be aware of the type of power source or status level of available power being used by the UE, whereby if the UE is powered by an external power source or the battery is being charged the UE may determine that the need for FD procedure is reduced or even not needed as sufficient power is available. Alternatively, the UE connection manager 110 may use a battery power level indication as one additional input to trigger the need to activate, or inhibit, the FD procedure, for example enabling the UE connection manager's 110 knowledge of application status to only trigger or allow to trigger a FD procedure if the UE is only being powered by a battery or possibly when the power is below a certain level. The UE connection manager 110 may use such knowledge to determine whether the UE needs any of the radio resources currently assigned to the UE or scheduled for the UE based on such upper layer knowledge. In an embodiment, if no current applications are running or scheduled in a relatively short amount of time, the UE connection manager 110 may send an FD indication 131 to the RRC layer 130, or the FD indication 141 might be sent to the MAC layer 140. Alternatively, the UE connection manager 110 may send the FD indication 131 to the RRC layer 130 which may in turn forward the FD indication 132 to the MAC layer 140. In an embodiment, the RRC layer 130 may send the FD indication to the network or ENB using an RRC message, for example a Signaling Connection Release Indication (SCRI), RRC Connection Release Indication (RCRI) or RRC Connection Release Request (RCRR) message. In an embodiment, the RRC layer 130 may send the FD indication to the network or ENB within an RRC message within an information element comprising a cause value associated with FD indication. For instance, an extension cause indicating "end of data transmission" may be included within an RRC message and sent. In an alternative embodiment, the MAC layer 140 may send the FD indication to the network or ENB using a MAC control element, the control element may have fixed size of 0 octets and be identified by a MAC sub-header comprising a unique logical channel identity (LCID) designated for use for FD indication. For instance, the MAC sub-header may have a length equal to about one octet. Alternatively, the MAC layer FD indication may be a short BSR MAC control element identified by the sub-header comprising a unique LCID designated for use for FD indication by BSR. Other MAC indications, e.g., not requiring that an explicit RRC message be sent as a response to the FD indication, may also be used. In this case, the MAC control element for FD indication has the size of about one octet.

Further, the UE connection manager 110 may be aware of the status of the UE data or application buffer, and may use such knowledge with the upper layer knowledge to determine whether the UE can release the assigned or scheduled radio resources. In an embodiment, if no current applications are running or scheduled, for a period (e.g., short) of time and the buffer is empty, the UE connection manager 110 may determine to send the FD indication to the RRC layer 130 or the MAC layer 140. Additionally, the RRC layer 130 or the MAC layer 140 may be aware of the status of the inactivity timer at the network and may use this along with such upper layer knowledge as indicated by the UE connection manager 110 and/or buffer information to determine whether to send the FD indication. The FD indication may be sent via an RRC message or via a MAC control element. In an embodiment, if no current applications are running or scheduled for a relatively short amount of time, the buffer is empty, and the uplink time alignment is maintained the FD indication may be transmitted. In another embodiment, if no current applications are running or scheduled for a relatively short amount of time, the buffer is empty, the uplink time alignment is not maintained and the inactivity timer may not expire before a relatively long amount of time, the FD indication may be transmitted.

Figure 2:
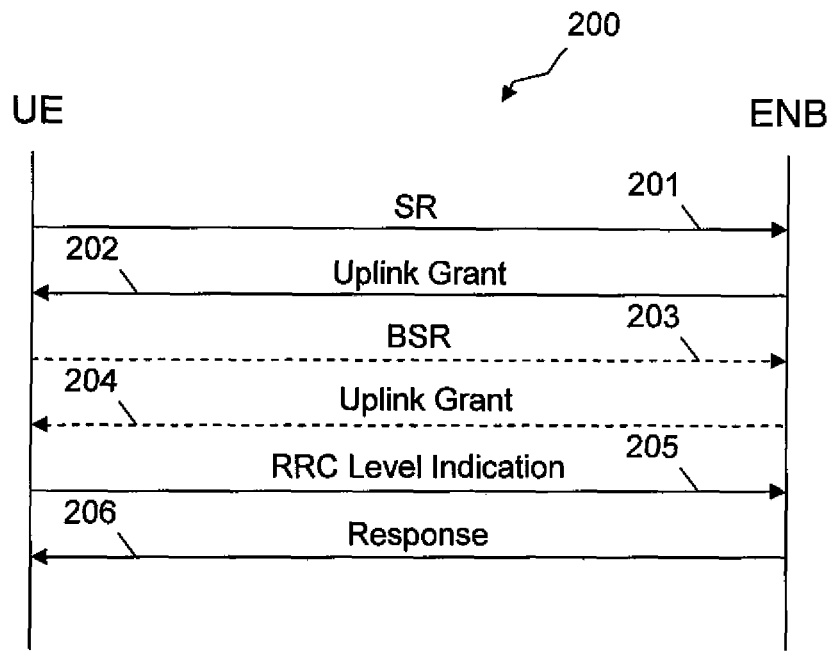
FIG. 2 is an illustration of an RRC fast dormancy indication procedure according to an embodiment of the disclosure.

FIG. 2 illustrates an embodiment of an FD indication procedure 200, where the RRC layer 130 at the UE may be used to send the FD indication to the network. When the UE connection manager 110 decides to forward the FD indication, the UE may use the RRC layer 130 to send an RRC FD indication message 205, such as an SCRI, RCRI or RCRR, to the network if there is no data to transmit. Specifically, the RRC FD indication may be sent when the UE maintains uplink (UL) time alignment (TA), i.e., time alignment for uplink transmissions. Accordingly, the UE may send a scheduling request (SR) message 201 to the network, which may be configured by the network (ENB) for contention free uplink access. The network may receive the SR message 201 and grant the UE uplink access, for instance by sending back an uplink grant message 202. The UE may then send a buffer status reporting (BSR) message 203 to obtain uplink resources for transmitting the RRC FD indication. The network may receive the BSR message 203 and grant the UE uplink resources, for instance by sending back an uplink grant message 204. The UE transmits the RRC FD indication to the network (ENB) 205. In some embodiments, if the uplink grant message 202 is sufficient for transmission of the RRC FD indication, the UE may transmit the indication to the network 205 without executing steps 203 and 204.

Finally, the network may reply with a response message 206, such as an RRC connection release message, to release the connection with the UE or to move the UE from the connected mode to the idle mode. In another embodiment, if the UE still maintains UL TA after sending the RRC FD indication message 205, the network may reply with an RRC connection reconfiguration message to release the uplink resources to stop the uplink transmission of channel status reports. In some embodiments the network may not send the response message 206 and instead may stop sending time alignment data to the UE, which may cause the UL TA timer to expire and hence stop the uplink transmissions from the UE.

Figure 3:
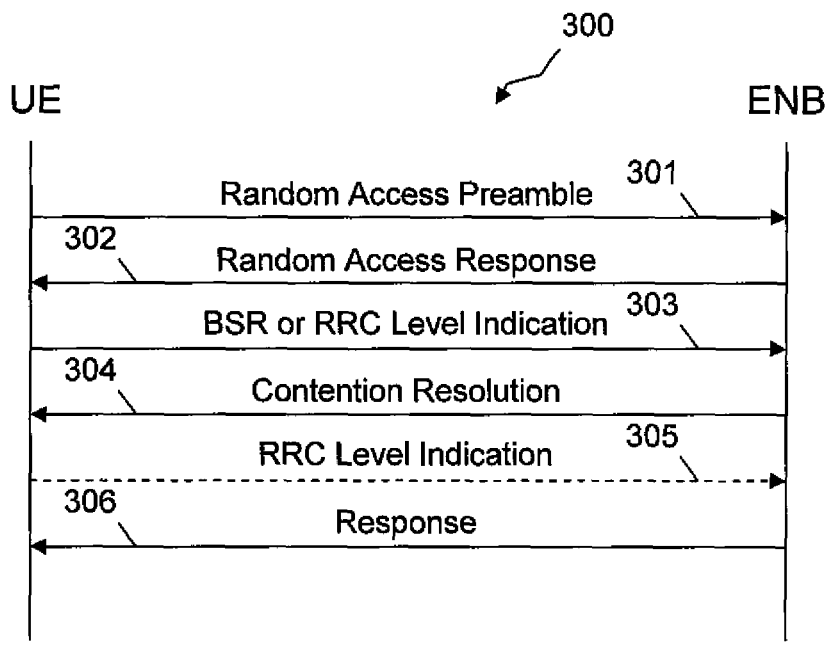
FIG. 3 is an illustration of another RRC fast dormancy indication procedure according to an embodiment of the disclosure.

FIG. 3 illustrates another embodiment of an FD indication procedure 300, where the RRC layer 130 at the UE may be used to send the FD indication to the network. When the UE connection manager 110 decides to forward the FD indication, the UE may use the RRC layer 130 to send an RRC indication message 205, such as an SCRI, RCRI or RCRR, to the network if there is no data to transmit. Specifically, the FD indication may be sent when the UL TA at the UE is not maintained or when the network does not configure scheduling requests for the UE. Accordingly, the UE may send a random access preamble 301 to the network, for contention based access and compete with other random access requests from other UEs, for example. Assuming there is no contention among the UEs, the network may receive the random access preamble 301 and grant the UE uplink access, for instance by sending back a random access response message 302 during a period defined by the network. Due to the possible contentions among the UEs the requesting UE may repeat sending the random access preamble 301 and receiving the random access response message 302, in comparison to sending the SR message 201 and receiving the uplink grant message 202 in the FD indication procedure 200 described above.

In an embodiment, when a preamble group B is available and radio conditions are acceptable, the UE may then select a preamble from the group and transmits the preamble 301 in order to obtain an uplink resource sufficiently large for transmitting the RRC FD indication. In response the network may return a random access response 302 which contains an uplink grant large enough to transmit the RRC FD indication. The UE then transmits the RRC FD indication 303. Alternatively, when a preamble group B is not available or radio conditions are not acceptable, the UE uses a preamble from the preamble group A and the network may send the random access response message 302 to the UE. The preamble group A and B are described in 3GPP TS36.321 specification. When the UE transmits a preamble from the group A 301, additional steps or messaging may then be required to execute the FD procedure 300 if the random access response 302 includes uplink grant not sufficient for the RRC ED indication. The UE may then send a BSR message 303 to the network or execute a BSR procedure with the network in order to obtain enough uplink grant to transmit the RRC FD indication 305. Regardless of the preamble group being used, the network may grant the UE uplink resources, for instance by sending back a contention resolution message 304. The network may then reply explicitly with a response message 306, which may be similar to the response message 206, or implicitly by stopping transmission of time alignment data to the UE.

In an alternative embodiment, when UL TA is not maintained, the UE may decide not to start the FD indication procedure 300. Instead, the UE may remain in the connected mode until the inactivity timer at the network is expired. On the expiry of the inactivity timer, the network will release the RRC connection and transition the UE in idle mode. The above behavior may be encouraged when the inactivity timer in the network will expire shortly. This inactivity timer may be measured by the UE, or could be signaled by the network to the UE (e.g., broadcast in a cell through system information RRC messages, or sent in a dedicated RRC message). Uplink transmission is one of the most expensive operations in terms of battery power consumption. Therefore if the UE knows that the network inactivity timer will expire in a short period of time, it may not be useful to send the indication. The UE may measure the value of network inactivity timer by the use of an internal timer which counts the time between the last data transmission and the RRC connection release or the network may indicate the value of inactivity timer to the UE. Alternatively, the UE may decide to delay sending an RRC indication message 305 to the network until another RRC procedure for mobility, for example measurement reporting, is initiated to increase the duration of the connected mode and hence reduce unnecessary mobility tracking and to improve UE battery efficiency.

Figure 4:
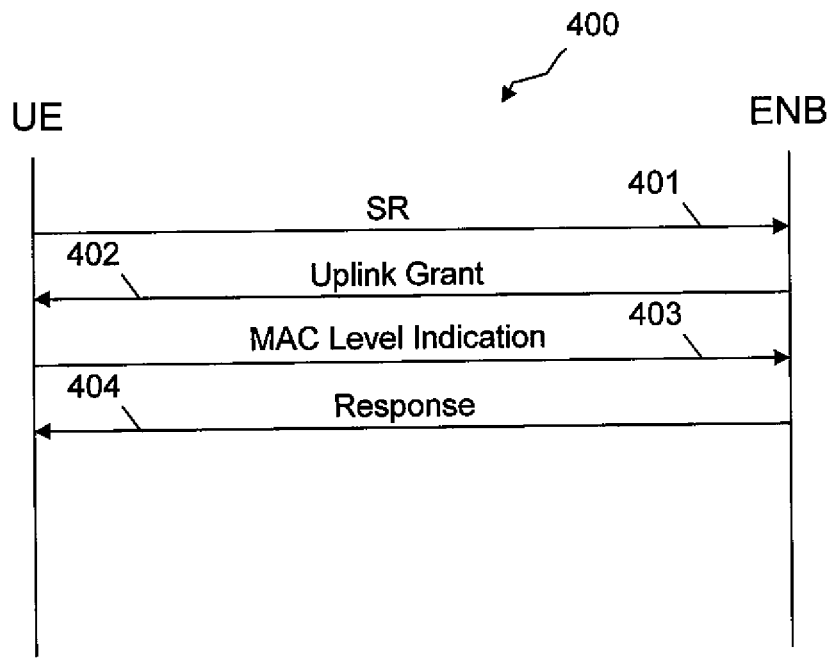
FIG. 4 is an illustration of a medium access control level fast dormancy indication procedure according to an embodiment of the disclosure.

FIG. 4 illustrates an embodiment of an FD indication procedure 400, where the MAC layer 140 at the UE may be used to send the FD indication to the network. When the UE connection manager 110 and/or the RRC layer 130 decide to forward the FD indication, the UE connection manager 110 and/or the RRC layer 130 may signal the MAC layer 140 to send a MAC FD indication 403 to the network if there is no data to transmit, or if there has not been any data to transmit within a given time duration. The MAC level indication 403 may comprise a MAC control element for FD indication, such as "End of Data Transmission" or "Fast Dormancy Indication." The control element may have fixed size of 0 octets and be identified by a MAC sub-header comprising a unique logical channel identity (LCID) designated for use for Fast Dormancy Indication. For instance, the MAC sub-header may have a length equal to about one octet. Alternatively, the MAC FD indication 403 may be a short BSR designated for use for FD indication and comprising a unique LCID. Specifically, the FD indication may be sent when the UE maintains UL TA. Accordingly, the UE may send an SR message 401 to the network, which may be configured for contention free uplink access. The network may receive the SR message 401 and grant the UE uplink access, for instance by sending back an uplink grant message 402. Due to the short length of the MAC FD indication, the uplink grant message 402 may comprise the uplink resource needed by the UE to transmit a MAC FD indication, therefore the UE may not need to send an additional message such as a BSR message. For instance, the MAC FD indication may be a MAC control element for FD indication. For instance, the MAC control element may have a length equal to about one octet including the MAC sub-header. The network may receive the SR message 401 and grant the UE uplink resources, for instance by sending back an uplink resource grant message 402. The UE then transmits the MAC FD indication 403.

The network may then reply explicitly with a response message 404, similar to the FD procedure 200, or implicitly by not sending time alignment data to the UE. For instance, the response message 404 may be RRC Connection Release message or a MAC control element for releasing uplink resources, such as "release Uplink Control Information Resource" and the time alignment data may comprise a time advance MAC control element for aligning the UL time at the UE.

Figure 5:
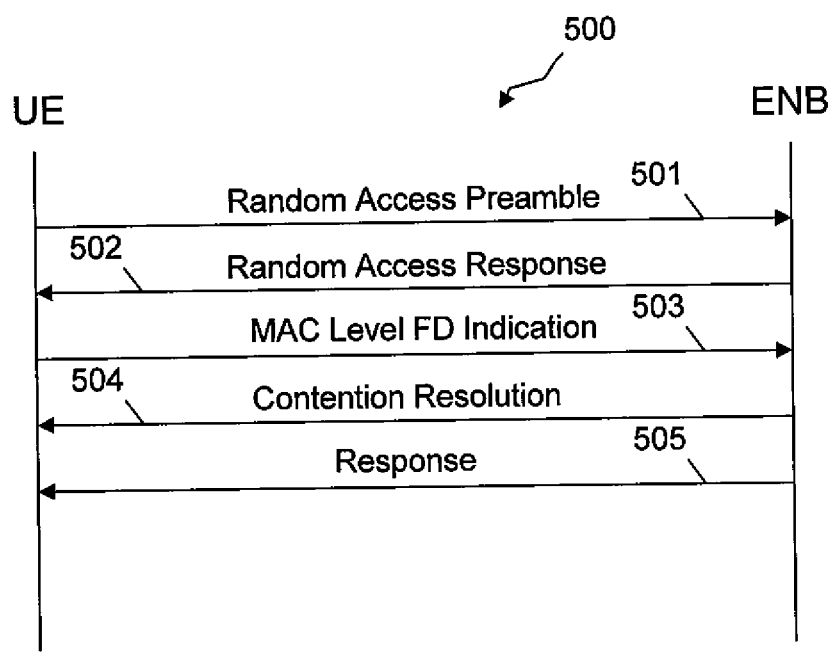
FIG. 5 is an illustration of another medium access control level fast dormancy indication procedure according to an embodiment of the disclosure.

FIG. 5 illustrates another embodiment of an FD indication procedure 500, where the MAC layer 140 at the UE may be used to send the FD indication to the network if there is no data to transmit when the UE connection manager 110 and/or the RRC layer 130 decide to forward the FD indication. Specifically, the FD indication may be sent when the UL TA at the UE is not maintained or when the network does not configure scheduling requests for the UE. Accordingly, the UE may send a random access preamble 501 to the network for contention access. Where there are no contentions among the UEs the network may receive the random access preamble 501 and grant the UE uplink access when possible or applicable, for instance by sending back a random access response message 502. Due to the short length of the MAC FD indication, the random access response message 502 may comprise the uplink resource needed by the UE to transmit a MAC FD indication 503. Therefore, the UE may not need to send an additional message such as a BSR message. For instance, the MAC FD indication 503 may be a MAC control element for FD indication, in addition to a C-RNTI control element. For instance, the MAC control element and its sub-header may have a length equal to about one octet and the C-RNTI control element and its sub-header may have a length equal to about three octets. Further, the network may send back a contention resolution message 504 to the UE, to solve any possible contentions among the UEs. The network may then reply explicitly with a response message 505, similar to the FD procedure 400, or implicitly by stopping time alignment data to the UE. In an alternative embodiment, when UL TA is not maintained, the UE may decide not to start the FD indication procedure 500. Instead, the UE may remain in the connected mode until the timer expires, similar to the FD procedure 300.

Comparing the FD procedures 500 and 400 to the FD procedures 300 and 200, it is apparent that the MAC FD indication may be more efficient than the RRC FD indication as fewer and shorter messages are sent. On the other hand, during the MAC FD indication no message authentication is executed. However, an ENB may check if there is any on-going data transfer activity for the UE that may have triggered the FD indication procedure, for instance based on the BSR messages received from the UE or the downlink buffer status. If there is on-going activity, the ENB may consider that the FD indication is invalid and may ignore it. Alternatively, the ENB may provide a small uplink grant to trigger a BSR from the UE. If the buffer is not empty, the ENB may consider that the FD indication is not valid. If higher security is required, the MAC FD indication may be extended to carry a short message authentication code derived from C-RNTI and an integrity protection key associated with the connection, for example.

Figure 6:
FIG. 6 is an illustration of a plurality of fast dormancy configurations according to an embodiment of the disclosure.

FIG. 6 discloses three options that are actually different ways in which FD can be configured by the network—and it is likely that only a single one of these options would be adopted by the system at one time. FIG. 6 illustrates some embodiments for the configuration of FD 600, which may be supported in the network. An FD configuration may comprise a plurality of configuration parameters, including for example, an indication that FD indications are permitted to be sent by the UE and an inhibition timer. For instance, in a first FD configuration 600 (Option 1), a system information RRC message is used to send the configuration to the UE. The scope of configuration is the cell so the set of configuration parameters are applied to all UEs in the cell. In this case, the UE is granted the right to select the target bearer to which the FD indication will apply. In a second FD configuration 600 (Option 2), the RRC Connection Setup message is used to send the configuration to the UE, the scope of configuration is the UE so the set of configuration parameters is applied to only that UE receiving the message. The UE is granted the right to select the target bearer to which the FD indication will apply. Further, in a third FD configuration 600 (Option 3), the RRC Connection Reconfiguration message is used to send the configuration to the UE, the scope of configuration is the UE or radio bearer so the set of configuration parameters is applied to only that UE receiving the message or to that radio bearer defined in the message.

Additionally, the FD configuration may be limited to a specific radio bearer or bearers or resource or resources assigned to the UE, for instance corresponding to an interactive or background type, or may be applied to all radio bearers currently used by the UE. A target radio bearer or bearers may be selected by the UE based on its knowledge of on-going connections and their traffic nature and according to its FD procedure. In an embodiment, the FD configuration may comprise additional parameters, including a value for an inhibition timer, which may be preset and used by the network to control the frequency for transmitting FD indications from the UE, as will be described in more detail below.

In an embodiment, the FD configuration parameters or information elements, which may determine the FD behavior, may be defined using a system information block, an RRC connection setup message, an RRC Connection Reestablishment message, or an RRC connection reconfiguration message. In an embodiment, the FD configuration may comprise an optional parameter which may be configured and hence included or excluded with the remaining parameters in the system information block or RRC message. As an example, the FD configuration parameters or information elements in the system information block or RRC message may be defined as:

```
FastDormacy-Config ::=  SEQUENCE {
    fastDormancyInhibitTimer ENUMERATED
    {f0, f1, f10, f100, f1000, } OPTIONAL
    -- default f0
}
```

In an embodiment, other types of networks, which may not be LTE based networks, may support FD behavior or at least some FD functionalities, such as a UTRAN. Hence, when the UE may be transported or relocated between such networks, the FD information element may be transmitted during intra-E-UTRAN handover or inter-radio access technology (RAT) handover between E-UTRAN and UTRAN. For instance, the RRC connection reconfiguration message may be used during handover between UTRAN to E-UTRAN handover, while an Evolved UMTS Terrestrial Radio Access (E-UTRA) mobility command may be used for handover between E-UTRAN to UTRAN.

Figure 7:
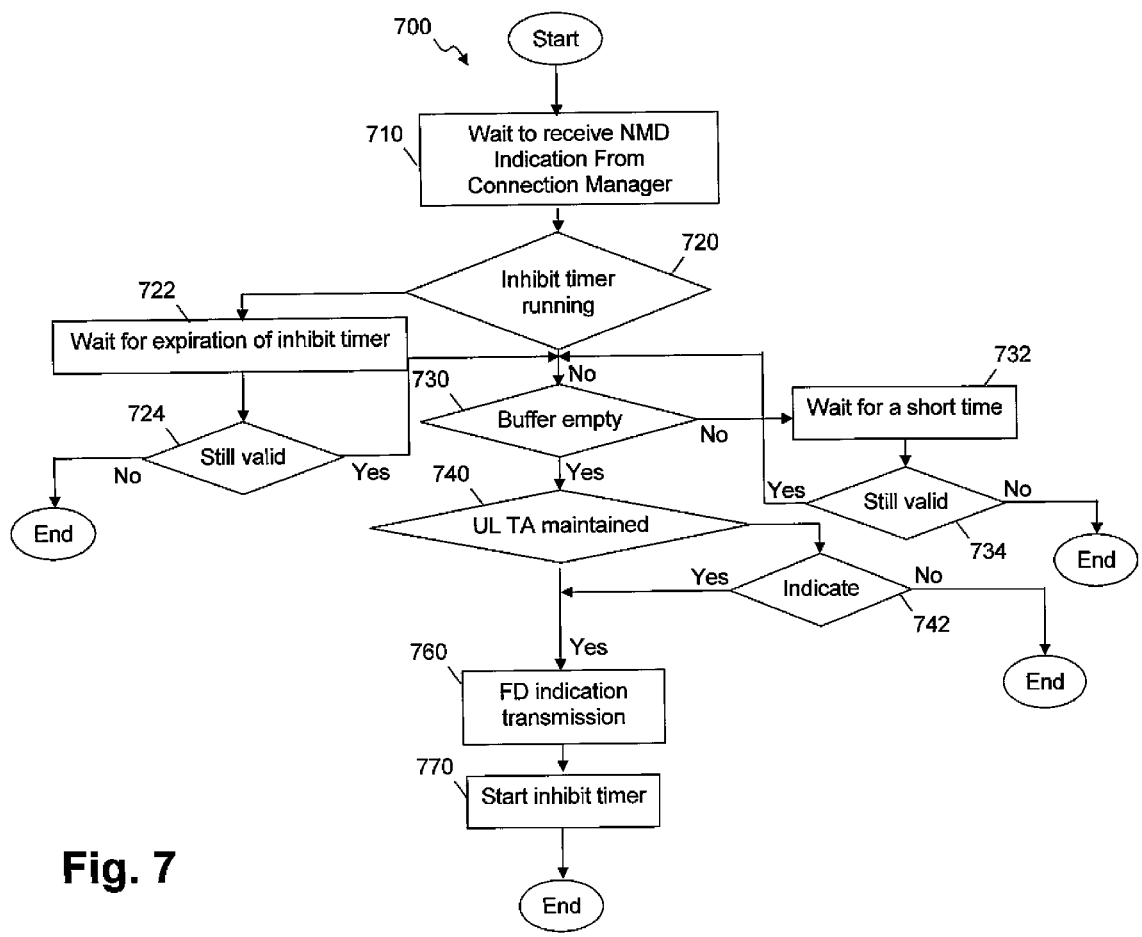
FIG. 7 is a flow chart of a method for a UE fast dormancy behavior according to an embodiment of the disclosure.

FIG. 7 illustrates a method 700 for implementing the FD procedures or functions associated with the UE side. At block 710, the UE waits until it receives a trigger such as a no more data indication (NMD) from the UE connection manager 110. For instance, the UE connection manager may determine whether no more uplink data is transmitted or scheduled from upper layer applications and may inform the RRC or MAC layers at the UE. At block 720, the UE or the network may verify whether the inhibit timer is expired. The inhibit timer may be previously set, by the network, for instance for a short time duration to prevent the UE from sending a second or subsequent FD indication in quick repetition. The inhibit timer value represents the time duration during which the device is not allowed to send a subsequent FD indication (even if the other conditions for invoking FD become true again). The time duration may be pre-set in the standards or indicated from the network to the device as a RRC dedicated or system information. As such, the inhibit timer may reduce the frequency of transmitting the FD indications and hence allow more latency in the connected mode. The method 700 may proceed to block 722 if the inhibit timer is still running or may proceed to block 730 if the inhibit timer is expired or not running. At block 722, the UE may wait for the expiration of the inhibit timer. The method 700 may then proceed to block 724, where the UE may verify whether implementing the FD procedure is still valid, for instance when no more data is yet received or scheduled. If transmitted or received data is detected or scheduled the FD procedure may not be valid anymore, hence the method 700 may end, otherwise the method 700 or may proceed to block 730.

At block 730, the UE may verify whether data buffer for uplink transmission is empty. The data buffer is a buffer which stores PDCP Service Data Units (SDUs), PDCP Protocol Data Units (PDUs) and RLC PDUs for initial transmission or retransmission and is referred to as the buffer hereafter. For instance, the buffer may be monitored by the UE connection manager, or in an alternative embodiment by the RRC layer or MAC layer. The method 700 may proceed to block 740 if the buffer is empty, or may proceed to block 732 if the buffer is not empty. At block 732, the UE may wait for a preset time or until the buffer is empty and proceed to block 734, where the UE may verify whether implementing the FD procedure is still valid, as described above. If the FD procedure is determined to be still valid, the method 700 may proceed to block 740, otherwise the method 700 may end. At block 740, the UE may verify whether the UL TA is maintained. The method 700 may proceed to block 750 if the UL TA is still maintained, or may proceed to block 742 otherwise. At block 742, the UE may decide whether to send the FD indication, for instance by deciding whether to implement the FD procedure in an explicit manner. The UE decision may also be based on FD configuration, user preference, or network setup. The FD configuration may include a setting such that the UE can determine whether to initiate the FD procedure when TA is not maintained based on whether the UE would benefit in power efficiency from transmitting to the network in order to move to idle mode or whether it would be sufficient to remain in a timing unaligned status in RRC connected mode. The method 700 may end when implicit FD is decided, allowing the uplink time alignment timer to expire. The other embodiments of explicit or implicit decision are discussed above.

At block 760, the UE transmits FD indication to the network. The indication may be an RRC message or MAC control element which are also described above, the method to be implemented in the UE may be based on system design decision or a network protocol standard for instance 3GPP TS36.331. At block 770, the UE may start the inhibit timer since the FD indication has been sent to allow the delay between FD indications and hence reduce their frequency during connected mode. The method 700 may then return back to block 710 to restart the FD procedure.

Figure 8:
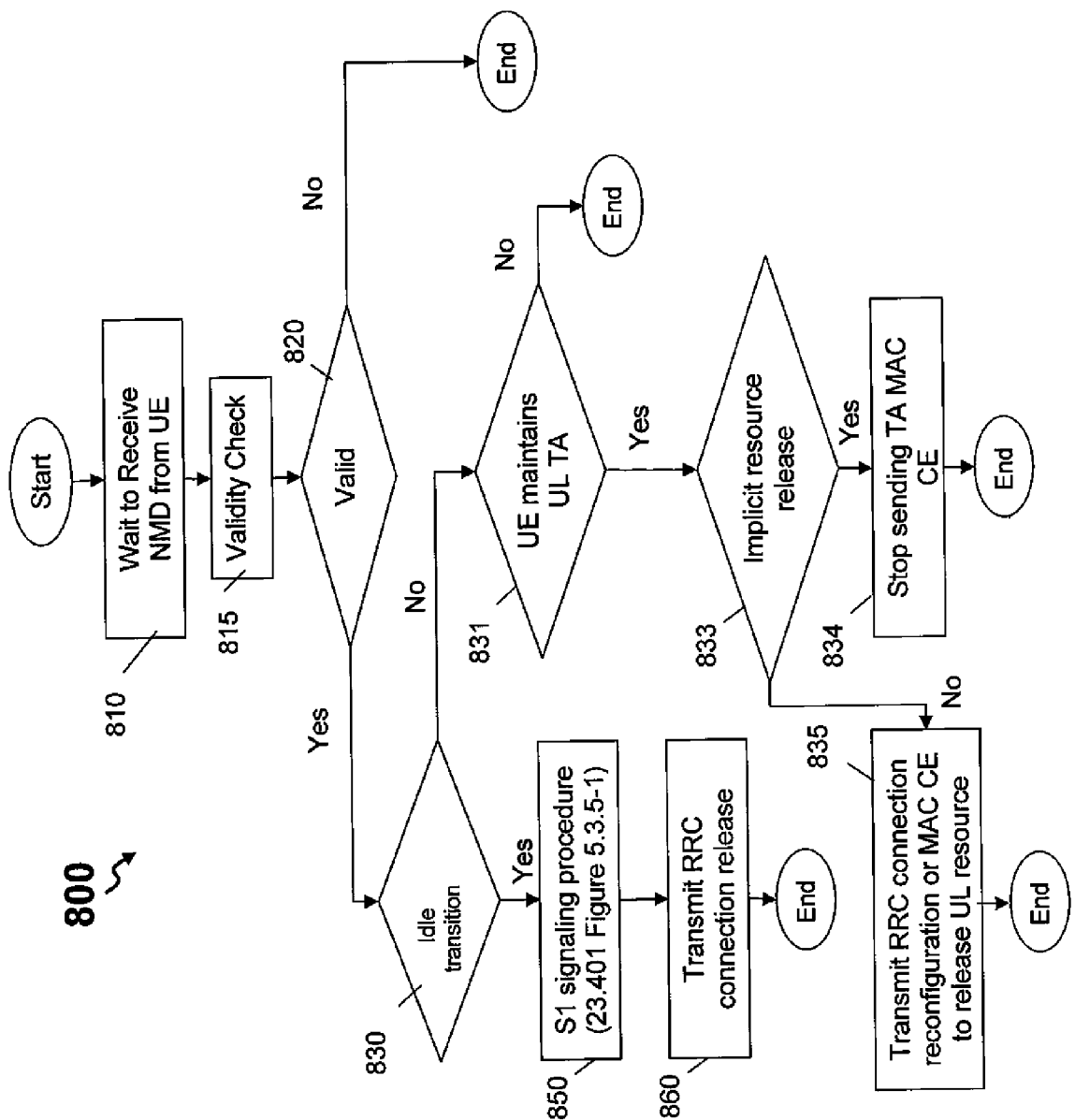
FIG. 8 is a flow chart of a method for an ENB fast dormancy behavior according to an embodiment of the disclosure.

FIG. 8 illustrates a method 800 for implementing the FD procedures or functions associated with the network or ENB. At block 810, the ENB may wait until it receives a no more data (NMD) indication from the UE. When it receives the indication from the UE, the method 800 moves on to block 815. At block 815, the ENB may check the validity of the FD indication. First of all the ENB may check if there is any downlink data available for the UE. If any downlink data is available, then the FD procedure may proceed to the block 820 and end. Otherwise, the ENB may verify the message authentication code (MAC) for integrity protection if RRC FD indication is received. If the MAC is correct the FD procedure may proceed to the block 820 and thereafter to the block 830. If MAC FD is received, the ENB may check to determine whether previously received BSR indicated an empty buffer or whether the ENB may provide a small uplink grant to the UE to trigger a new BSR in order to verify that the buffer is empty. If the buffer is confirmed empty the FD procedure may proceed to the block 820 and then to block 830, otherwise the FD procedure may end. For improvement of security of MAC FD indication, the MAC FD control element may be extended to contain a short MAC for integrity protection. The short MAC may be calculated using C-RNTI, Physical cell Id, current system frame number, for example. If the short MAC is correct, the FD procedure proceeds to 830, otherwise proceeds to 820 and ends. At block 830, the ENB may decide whether to transition the UE from the connected mode to the idle mode. The method 800 may proceed to block 850 if the condition of block 830 is met, otherwise the UE may proceed to block 831. At block 831, the ENB may verify whether the UE maintains UL TA. The method 800 may proceed to block 833 if the condition of block 831 is met, otherwise the FD procedure may end. At block 833, the ENB may decide to release the UEs uplink resources implicitly or explicitly. The method 800 may proceed to block 834 if implicit implementation is decided, otherwise the method 800 may proceed to block 835. At block 834, the ENB may stop sending TA commands to the UE, which may be MAC control elements (CE), so the UE will loose uplink time synchronization and hence release the uplink resources after expiration of a certain time. Alternatively, at block 835, the ENB may explicitly release the UEs uplink resources by transmitting an RRC connection reconfiguration message or a MAC CE, for instance to release uplink resources.

Figure 9:
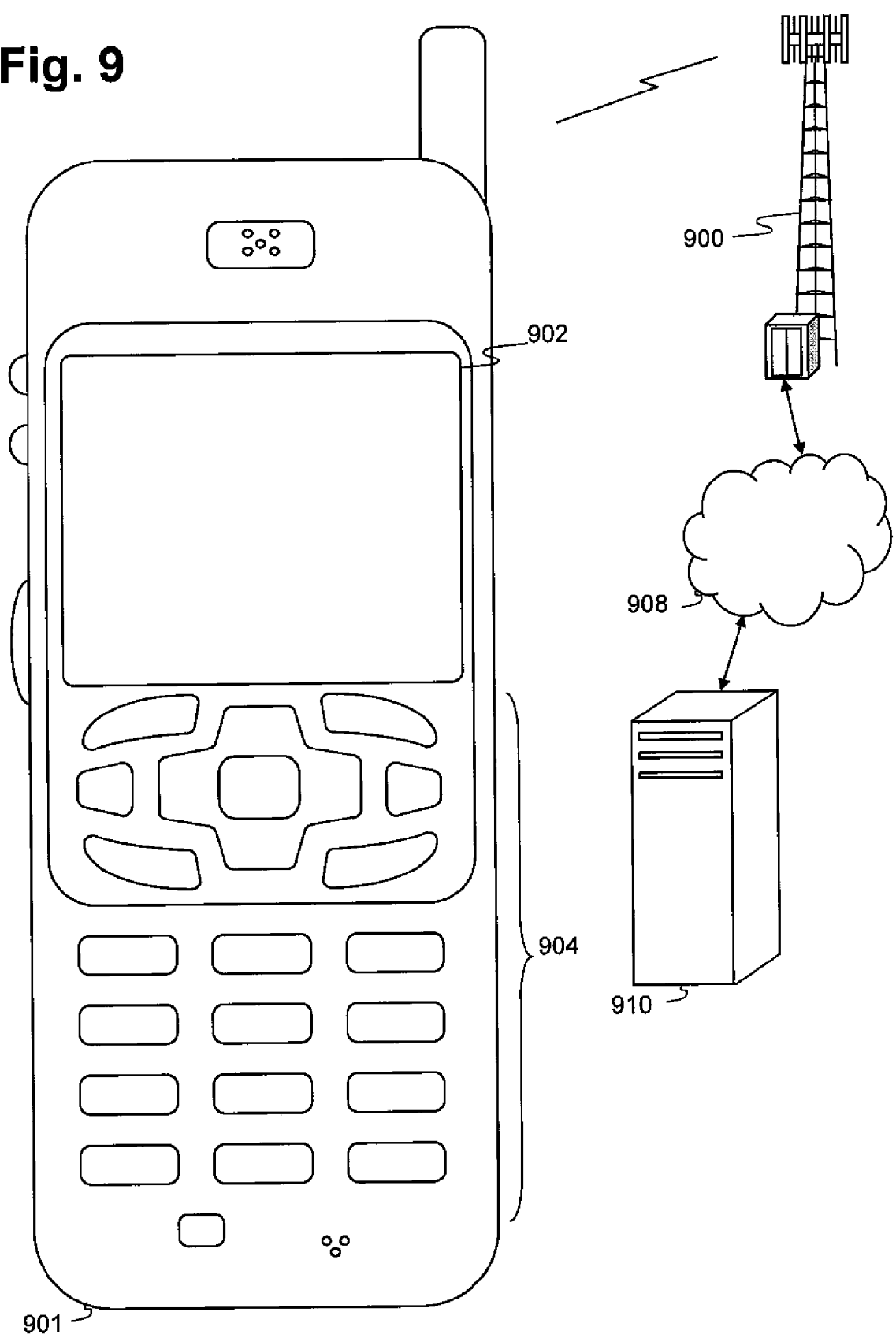
FIG. 9 is a diagram of a wireless communications system including a user agent operable for some of the various embodiments of the disclosure.

FIG. 9 illustrates a wireless communications system including an embodiment of the UE 901. The UE 901 is operable for implementing aspects of the disclosure, but the disclosure should not be limited to these implementations. Though illustrated as a mobile phone, the UE 901 may take various forms including a wireless handset, a pager, a personal digital assistant (PDA), a portable computer, a tablet computer, or a laptop computer. Many suitable devices combine some or all of these functions. In some embodiments of the disclosure, the UE 901 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 901 may be a portable, laptop or other computing device. The UE 901 may support specialized activities such as gaming, inventory control, job control, and/or task management functions, and so on.

The UE 901 includes a display 902. The UE 901 also includes a touch-sensitive surface, a keyboard or other input keys generally referred as 904 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 901 may present options for the user to select, controls for the user to actuate, and/or cursors or other indicators for the user to direct.

The UE 901 may further accept data entry from the user, including numbers to dial or various parameter values for configuring the operation of the UE 901. The UE 901 may further execute one or more software or firmware applications in response to user commands. These applications may configure the UE 901 to perform various customized functions in response to user interaction. Additionally, the UE 901 may be programmed and/or configured over-the-air, for example from a wireless base station, a wireless access point, or a peer UE 901.

Among the various applications executable by the UE 901 are a web browser, which enables the display 902 to show a web page. The web page may be obtained via wireless communications with a wireless network access node, a cell tower, a peer UE 901, or any other wireless communication network or system 900. The network 900 is coupled to a wired network 908, such as the Internet. Via the wireless link and the wired network, the UE 901 has access to information on various servers, such as a server 910. The server 910 may provide content that may be shown on the display 902. Alternately, the UE 901 may access the network 900 through a peer UE 901 acting as an intermediary, in a relay type or hop type of connection.

Figure 10:
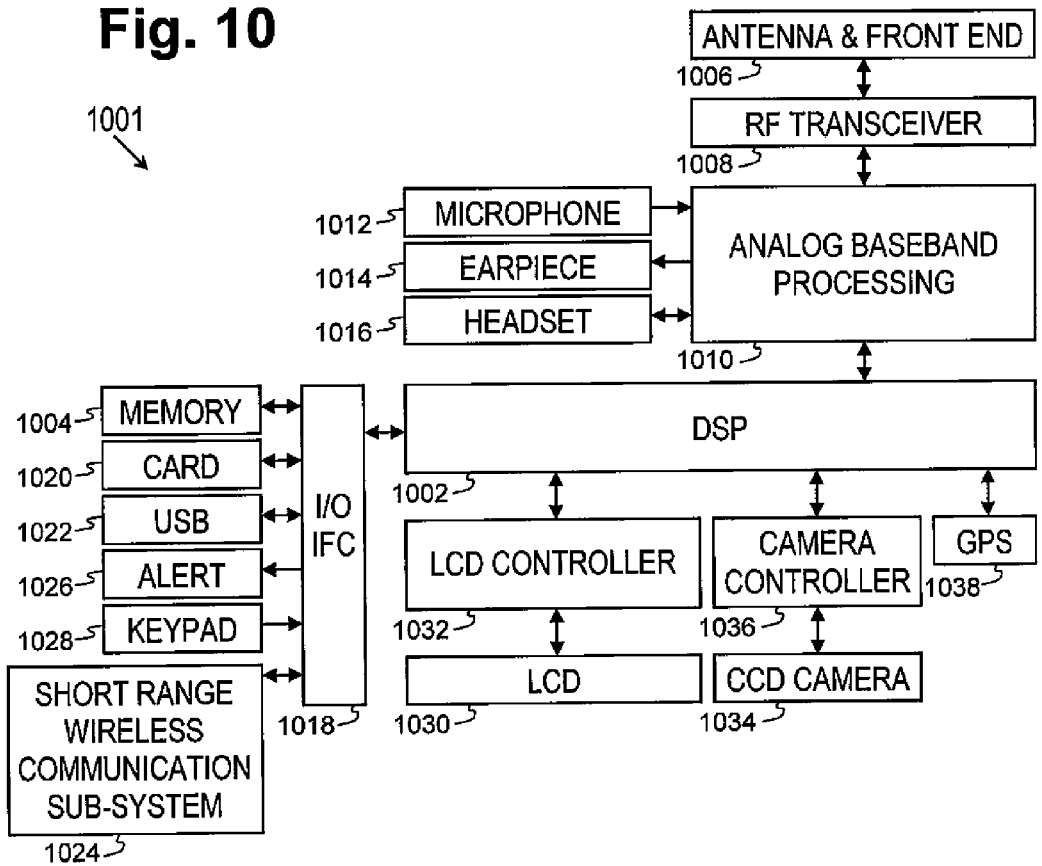
FIG. 10 is a block diagram of a user agent operable for some of the various embodiments of the disclosure.

FIG. 10 shows a block diagram of the UE 901. While a variety of known components of UEs 901 are depicted, in an embodiment a subset of the listed components and/or additional components not listed may be included in the UE 901. The UE 901 includes a digital signal processor (DSP) 1002 and a memory 1004. As shown, the UE 901 may further include an antenna and front end unit 1006, a radio frequency (RE) transceiver 1008, an analog baseband processing unit 1010, a microphone 1012, an earpiece speaker 1014, a headset port 1016, an input/output interface 1018, a removable memory card 1020, a universal serial bus (USB) port 1022, a short range wireless communication sub-system 1024, an alert 1026, a keypad 1028, a liquid crystal display (LCD), which may include a touch sensitive surface 1030, an LCD controller 1032, a charge-coupled device (CCD) camera 1034, a camera controller 1036, and a global positioning system (GPS) sensor 1038. In an embodiment, the UE 901 may include another kind of display that does not provide a touch sensitive screen. In an embodiment, the DSP 1002 may communicate directly with the memory 1004 without passing through the input/output interface 1018.

The DSP 1002 or some other form of controller or central processing unit operates to control the various components of the UE 901 in accordance with embedded software or firmware stored in memory 1004 or stored in memory contained within the DSP 1002 itself. In addition to the embedded software or firmware, the DSP 1002 may execute other applications stored in the memory 1004 or made available via information carrier media such as portable data storage media like the removable memory card 1020 or via wired or wireless network communications. The application software may comprise a compiled set of machine-readable instructions that configure the DSP 1002 to provide the desired functionality, or the application software may be high-level software instructions to be processed by an interpreter or compiler to indirectly configure the DSP 1002.

The antenna and front end unit 1006 may be provided to convert between wireless signals and electrical signals, enabling the UE 901 to send and receive information from a cellular network or some other available wireless communications network or from a peer UE 901. In an embodiment, the antenna and front end unit 1006 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 1006 may include antenna tuning and/or impedance matching components, RF power amplifiers, and/or low noise amplifiers.

The RF transceiver 1008 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1010 and/or the DSP 1002 or other central processing unit. In some embodiments, the RF Transceiver 1008, portions of the antenna and front end 1006, and the analog baseband processing unit 1010 may be combined in one or more processing units and/or application specific integrated circuits (ASICs).

The analog baseband processing unit 1010 may provide various analog processing of inputs and outputs, for example analog processing of inputs from the microphone 1012 and the headset 1016 and outputs to the earpiece 1014 and the headset 1016. To that end, the analog baseband processing unit 1010 may have ports for connecting to the built-in microphone 1012 and the earpiece speaker 1014 that enable the UE 901 to be used as a cell phone. The analog baseband processing unit 1010 may further include a port for connecting to a headset or other hands-free microphone and speaker configuration. The analog baseband processing unit 1010 may provide digital-to-analog conversion in one signal direction and analog-to-digital conversion in the opposing signal direction. In some embodiments, at least some of the functionality of the analog baseband processing unit 1010 may be provided by digital processing components, for example by the DSP 1002 or by other central processing units.

The DSP 1002 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1002 may perform modulation, coding, interleaving, and spreading, and for a receiver function the DSP 1002 may perform despreading, deinterleaving, decoding, and demodulation. In another embodiment, for example in an orthogonal frequency division multiplex access (OFDMA) technology application, for the transmitter function the DSP 1002 may perform modulation, coding, interleaving, inverse fast Fourier transforming, and cyclic prefix appending, and for a receiver function the DSP 1002 may perform cyclic prefix removal, fast Fourier transforming, deinterleaving, decoding, and demodulation. In other wireless technology applications, yet other signal processing functions and combinations of signal processing functions may be performed by the DSP 1002.

The DSP 1002 may communicate with a wireless network via the analog baseband processing unit 1010. In some embodiments, the communication may provide Internet connectivity, enabling a user to gain access to content on the Internet and to send and receive email or text messages. The input/output interface 1018 interconnects the DSP 1002 and various memories and interfaces. The memory 1004 and the removable memory card 1020 may provide software and data to configure the operation of the DSP 1002. Among the interfaces may be the USB interface 1022 and the short range wireless communication sub-system 1024. The USB interface 1022 may be used to charge the UE 901 and may also enable the UE 901 to function as a peripheral device to exchange information with a personal computer or other computer system. The short range wireless communication sub-system 1024 may include an infrared port, a Bluetooth interface, an IEEE 802.11 compliant wireless interface, or any other short range wireless communication sub-system, which may enable the UE 901 to communicate wirelessly with other nearby mobile devices and/or wireless base stations.

The input/output interface 1018 may further connect the DSP 1002 to the alert 1026 that, when triggered, causes the UE 901 to provide a notice to the user, for example, by ringing, playing a melody, or vibrating. The alert 1026 may serve as a mechanism for alerting the user to any of various events such as an incoming call, a new text message, and an appointment reminder by silently vibrating, or by playing a specific pre-assigned melody for a particular caller.

The keypad 1028 couples to the DSP 1002 via the interface 1018 to provide one mechanism for the user to make selections, enter information, and otherwise provide input to the UE 901. The keyboard 1028 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 1030, which may include touch screen capability and also display text and/or graphics to the user. The LCD controller 1032 couples the DSP 1002 to the LCD 1030.

The CCD camera 1034, if equipped, enables the UE 901 to take digital pictures. The DSP 1002 communicates with the CCD camera 1034 via the camera controller 1036. In another embodiment, a camera operating according to a technology other than Charge Coupled Device cameras may be employed. The GPS sensor 1038 is coupled to the DSP 1002 to decode global positioning system signals, thereby enabling the UE 901 to determine its position. Various other peripherals may also be included to provide additional functions, e.g., radio and television reception.

Figure 11:
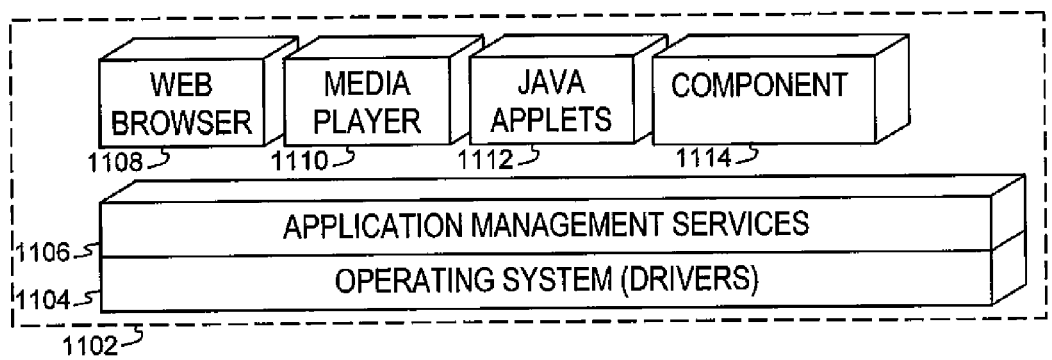
FIG. 11 is a diagram of a software environment that may be implemented on a user equipment operable for some of the various embodiments of the disclosure.

FIG. 11 illustrates a software environment 1102 that may be implemented by the DSP 1002. The DSP 1002 executes operating system drivers 1104 that provide a platform from which the rest of the software operates. The operating system drivers 1104 provide drivers for the UE hardware with standardized interfaces that are accessible to application software. The operating system drivers 1104 include application management services ("AMS") 1106 that transfer control between applications running on the UE 901. Also shown in FIG. 11 are a web browser application 1108, a media player application 1110, and Java applets 1112. The web browser application 1108 configures the UE 901 to operate as a web browser, allowing a user to enter information into forms and select links to retrieve and view web pages. The media player application 1110 configures the UE 901 to retrieve and play audio or audiovisual media. The Java applets 1112 configure the UE 901 to provide games, utilities, and other functionality. A component 1114 might provide functionality described herein. Although shown at an application layer, the component 1114 might be provided at various layers within the environment 1102 or elsewhere on the UE 901.

Figure 12:
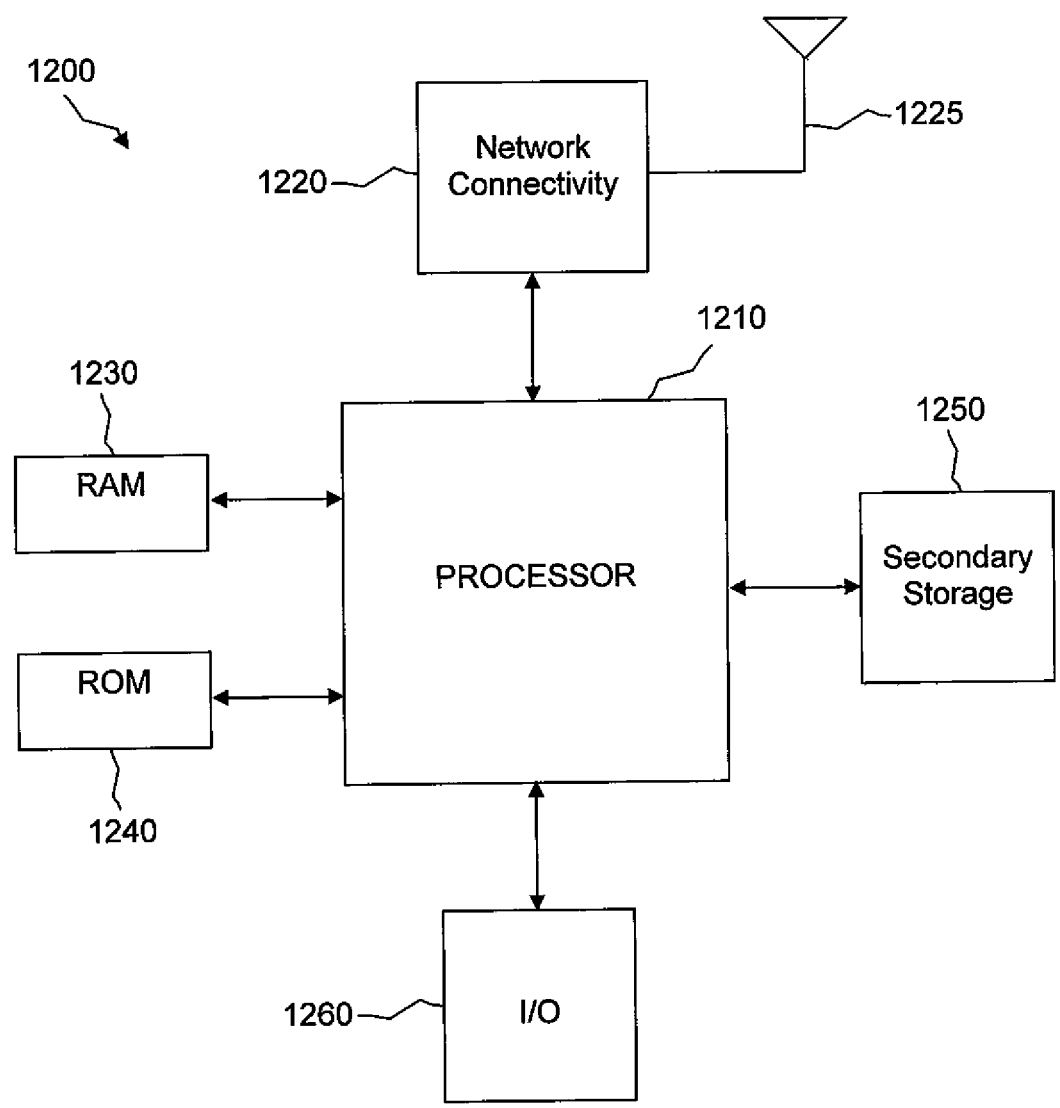
FIG. 12 illustrates an exemplary general-purpose computer system suitable for implementing the several embodiments of the present disclosure.

The UE 901 and other components described above might include a processing component that is capable of executing instructions related to the actions described above. FIG. 12 illustrates an example of a system 1200 that includes a processing component 1210 suitable for implementing one or more embodiments disclosed herein. In addition to the processor 1210 (which may be referred to as a central processor unit or CPU), the system 1200 might include network connectivity devices 1220, random access memory (RAM) 1230, read only memory (ROM) 1240, secondary storage 1250, and input/output (I/O) devices 1260. In some cases, some of these components may not be present or may be combined in various combinations with one another or with other components not shown. These components might be located in a single physical entity or in more than one physical entity. Any actions described herein as being taken by the processor 1210 might be taken by the processor 1210 alone or by the processor 1210 in conjunction with one or more components shown or not shown in the drawing.

The processor 1210 executes instructions, codes, computer programs, or scripts that it might access from the network connectivity devices 1220, RAM 1230, ROM 1240, or secondary storage 1250 (which might include various disk-based systems such as hard disk, floppy disk, or optical disk). While only one processor 1210 is shown, multiple processors may be present. Thus, while instructions may be discussed as being executed by a processor, the instructions may be executed simultaneously, serially, or otherwise by one or multiple processors. The processor 1210 may be implemented as one or more CPU chips.

The network connectivity devices 1220 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1220 may enable the processor 1210 to communicate with the Internet or one or more telecommunications networks or other networks from which the processor 1210 might receive information or to which the processor 1210 might output information.

The network connectivity devices 1220 might also include one or more transceiver components 1225 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1225 might include separate receiving and transmitting units or a single transceiver. Information transmitted or received by the transceiver component 1225 may include data that has been processed by the processor 1210 or instructions that are to be executed by processor 1210. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1230 might be used to store volatile data and perhaps to store instructions that are executed by the processor 1210. The ROM 1240 is a non-volatile memory device that typically has a smaller memory capacity than the memory capacity of the secondary storage 1250. ROM 1240 might be used to store instructions and perhaps data that are read during execution of the instructions. Access to both RAM 1230 and ROM 1240 is typically faster than to secondary storage 1250. The secondary storage 1250 is typically comprised of one or more disk drives or tape drives and might be used for non-volatile storage of data or as an over-flow data storage device if RAM 1230 is not large enough to hold all working data. Secondary storage 1250 may be used to store programs that are loaded into RAM 1230 when such programs are selected for execution.

The I/O devices 1260 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1225 might be considered to be a component of the I/O devices 1260 instead of or in addition to being a component of the network connectivity devices 1220. Some or all of the I/O devices 1260 may be substantially similar to various components depicted in the previously described drawing of the UE 901, such as the display 902 and the input 904.

The following Third Generation Partnership Project (3GPP) Technical Specifications (TS) are incorporated herein by reference for all purposes: TS23.401, TS23.203, TS36.331, TS36.304, TS36.321 and TS36.300. The following U.S. patent applications are also incorporated herein by reference for all purposes: Ser. No. 11/302,263 filed Dec. 14, 2005; 60/747,466 filed May 17, 2006; Ser. No. 11/464,380 filed Aug. 14, 2006; 60/956,785 filed Aug. 20, 2007; Ser. No. 12/195,018 filed Aug. 20, 2008; 61/061,359 filed Jun. 13, 2008; 61/074,856 filed Jun. 23, 2008; 61/086,955 filed Aug. 7, 2008; 61/089,731 filed Aug. 18, 2008 and Ser. No. 12/270, 522 filed Nov. 13, 2008.

In an embodiment, a method is provided for sending a Fast Dormancy (FD) indication from a User Equipment (UE) to an access device through a Media Access Control (MAC) layer. The method includes receiving an indication from an upper layer that there is no more data for a prolonged period of time and generating and sending a MAC control element to the access device.

In another embodiment, a method is provided for responding to a FD indication from a UE. The method include responding to the FD indication by at least one of releasing a connection with the UE, moving the UE from a connected mode to an idle mode, replying with a reconfiguration message to release an uplink resource to stop an uplink transmission of a channel status report, and stopping sending a time alignment command to the UE.

In another embodiment, a method is provided for responding to a FD indication from a UE through a Media Access Control (MAC) layer. The method includes determining whether there is any on-going data transfer activity for the UE that may have triggered the FD indication and ignoring the FD indication if there is on-going data transfer activity.

In another embodiment, a method is provided for sending a FD indication from a UE to an access device through a Radio Resource Control (RRC) protocol layer. The method includes, when an uplink (UL) time alignment (TA) is maintained between the UE and the access device, sending a scheduling request (SR), receiving an uplink grant, and sending the RRC FD indication.

In another embodiment, a method is provided for handling a FD indication during an inter-radio access technology (RAT) handover. The method includes transmitting FD configuration parameters using a RRC connection reconfiguration message during a handover to a long term evolution (LTE) network.

In another embodiment, a UE is provided. The UE includes a processor configured such that the UE sends a FD indication to an access device through a MAC layer by receiving an indication from an upper layer that there is no more data for a prolonged period of time, and generating and sending a MAC control element to the access device.

In another embodiment, an access device is provided. The access device includes a processor configured such that the access device responds to a FD indication from a UE by at least one of releasing a connection with the UE, moving the UE from a connected mode to an idle mode, replying with a reconfiguration message to release an uplink resource to stop an uplink transmission of a channel status report, and stopping sending a time alignment command to the UE.

In another embodiment, an access device is provided. The access device includes a processor configured such that the access device responds to a FD indication from a UE through a MAC layer by determining whether there is any on-going data transfer activity for the UE that may have triggered the FD indication and ignoring the FD indication if there is on-going data transfer activity.

In another embodiment, a UE is provided. The UE includes a processor configured such that the UE sends a FD indication to an access device through a RRC protocol layer, wherein, when a UL TA is maintained between the UE and the access device, the UE sends a scheduling request, receives an uplink grant, and sends the RRC FD indication.

In another embodiment, a UE is provided. The UE includes a processor configured such that the UE handles a FD indication during an inter-RAT handover by transmitting FD configuration parameters using a RRC connection reconfiguration message during a handover to a LTE network.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a user equipment (UE), the method comprising:

determining whether a type of one or more bearers assigned to the UE is a background type or an interactive type;
determining a status of an inhibit timer reflecting whether the inhibit timer has expired or is not running;
determining whether to send a request for a more energy efficient state or mode based on the determined type of the one or more bearers and the status of the inhibit timer, wherein an inhibit timer value represents a time duration during which the UE is prevented from sending a subsequent request for the more energy efficient state or mode; and
transmitting the request based on the determining of whether to send the request for the more energy efficient state or mode.

2. A method performed by a network element, the method comprising:
determining whether a type of one or more bearers assigned to a user equipment (UE) is a background type or an interactive type;
determining whether to permit the UE to send a request for a more energy efficient state or mode based on the determined type of the one or more bearers assigned to the UE;
generating an indication based on the determining;
setting an inhibit timer value, wherein the inhibit timer value represents a time duration during which the UE is prevented from sending a subsequent request for the more energy efficient state or mode; and
transmitting the indication and the inhibit timer value to the UE.

3. The method of claim 2, wherein transmitting the indication comprises transmitting a Radio Resource Control (RRC) Connection Reconfiguration message.

4. A user equipment (UE) comprising transmitter, receiver, memory and a processor, the processor configured to:
determine whether a type of one or more bearers assigned to the UE is a background type or an interactive type;
determine a status of an inhibit timer reflecting whether the inhibit timer has expired or is not running;
determine whether to send a request for a more energy efficient state or mode based on the determined type of the one or more bearers and the status of the inhibit timer, wherein an inhibit timer value represents a time duration during which the UE is prevented from sending a subsequent request for the more energy efficient state or mode; and
transmit the request based on the determination of whether to send the request for the more energy efficient state or mode.

5. A network element comprising transmitter, receiver, memory and a processor, the processor configured to:
determining whether a type of one or more bearers assigned to a user equipment (UE) is a background type or an interactive type;
determine whether to permit the UE to send a request for a more energy efficient state or mode based on the determined type of the one or more bearers assigned to the UE;
generate an indication based on the determining;
set an inhibit timer value, wherein the inhibit timer value represents a time duration during which the UE is prevented from sending a subsequent request for the more energy efficient state or mode; and
transmit the indication and the inhibit timer value to the UE.

6. The network element of claim 5, wherein the transmitting the indication comprises transmitting a Radio Resource Control (RRC) Connection Reconfiguration message.

7. The method of claim 1, further comprising receiving the inhibit timer value via radio resource control signaling.

8. The UE of claim 4, wherein the processor is further configured to receive the inhibit timer value via dedicated radio resource control signaling.

* * * * *

UNITED STATES PATENT AND TRADEMARK OFFICE
CERTIFICATE OF CORRECTION

| | |
|---|---|
| PATENT NO. | : 9,125,208 B2 |
| APPLICATION NO. | : 12/616024 |
| DATED | : September 1, 2015 |
| INVENTOR(S) | : Takashi Suzuki et al. |

It is certified that error appears in the above-identified patent and that said Letters Patent is hereby corrected as shown below:

IN THE CLAIMS

In Column 20, Line 15, In Claim 5, delete "determining" and insert -- determine --, therefor.

Signed and Sealed this
Twelfth Day of January, 2016

Michelle K. Lee
*Director of the United States Patent and Trademark Office*